United States Patent
Cheng et al.

(10) Patent No.: US 10,796,501 B2
(45) Date of Patent: Oct. 6, 2020

(54) INTERACTIVE SHARING OF VEHICLE SENSOR INFORMATION

(71) Applicant: QUALCOMM Incorporated, San Diego, CA (US)

(72) Inventors: Hong Cheng, Bridgewater, NJ (US); Michaela Vanderveen, Tracy, CA (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/010,376

(22) Filed: Jun. 15, 2018

(65) Prior Publication Data
US 2018/0365909 A1    Dec. 20, 2018

Related U.S. Application Data

(60) Provisional application No. 62/522,019, filed on Jun. 19, 2017.

(51) Int. Cl.
*G07C 5/00* (2006.01)
*H04W 4/40* (2018.01)
*H04Q 9/00* (2006.01)
*H04L 29/08* (2006.01)
(Continued)

(52) U.S. Cl.
CPC ............. *G07C 5/008* (2013.01); *H04L 67/12* (2013.01); *H04Q 9/00* (2013.01); *H04W 4/40* (2018.02); *H04Q 2209/00* (2013.01); *H04Q 2209/40* (2013.01); *H04W 84/005* (2013.01); *H04W 84/18* (2013.01)

(58) Field of Classification Search
CPC ........ G07C 5/008; H04W 4/40; H04W 84/18; H04W 4/46; H04W 84/005; H04L 67/12; H04Q 9/00; H04Q 2209/00; H04Q 2209/20; H04Q 2209/40; H04Q 2209/43; H04Q 2209/50; H04Q 2209/80; H04Q 2209/84
See application file for complete search history.

(56) References Cited

U.S. PATENT DOCUMENTS

| | | | |
|---|---|---|---|
| 7,961,095 B2 * | 6/2011 | George | G08B 27/001 340/539.1 |
| 8,068,463 B2 * | 11/2011 | Chen | H04L 45/48 370/334 |

(Continued)

OTHER PUBLICATIONS

International Search Report and Written Opinion—PCT/US2018/038048—ISA/EPO—dated Sep. 19, 2018.

*Primary Examiner* — Franklin D Balseca
(74) *Attorney, Agent, or Firm* — Loza & Loza LLP

(57) ABSTRACT

Various aspects of the disclosure relate to sharing vehicle sensor information. In some aspects, a requestor (e.g., a first vehicle) may transmit a request for vehicle sensor information. A responder (e.g., a second vehicle) may then respond with information sensed by the responder. For example, a requestor may unicast a vehicle-to-anything (V2X) message that requests a particular responder to share specified sensor information. As another example, a requestor may broadcast a vehicle-to-anything (V2X) message that requests any responder that meets a response criterion (or response criteria) to share specified sensor information.

20 Claims, 17 Drawing Sheets

(51) Int. Cl.
    *H04W 84/18*    (2009.01)
    *H04W 84/00*    (2009.01)

(56) References Cited

U.S. PATENT DOCUMENTS

| | | | | |
|---|---|---|---|---|
| 8,169,964 | B2* | 5/2012 | Kolding | H04L 1/1664 |
| | | | | 370/330 |
| 9,165,469 | B2* | 10/2015 | Bowers | G08G 1/166 |
| 9,311,818 | B2* | 4/2016 | Lin | G08G 1/166 |
| 9,363,710 | B1* | 6/2016 | Ganesh | H04W 28/20 |
| 9,729,943 | B2* | 8/2017 | Cameron | H04Q 9/00 |
| 9,801,202 | B2* | 10/2017 | Sakwa | H04L 67/322 |
| 9,990,844 | B2* | 6/2018 | Park | G08G 1/0112 |
| 10,057,742 | B2* | 8/2018 | Condeixa | H04W 4/70 |
| 10,111,058 | B2* | 10/2018 | Jurzak | H04L 1/08 |
| 10,135,624 | B2* | 11/2018 | Bill | H04L 9/3271 |
| 10,187,766 | B2* | 1/2019 | Lee | H04W 4/046 |
| 10,248,184 | B2* | 4/2019 | Sharma | G06F 1/3293 |
| 2014/0351181 | A1* | 11/2014 | Canoy | G06N 20/00 |
| | | | | 706/12 |
| 2015/0271642 | A1* | 9/2015 | Raymond | H04W 4/023 |
| | | | | 455/456.1 |
| 2016/0334547 | A1 | 11/2016 | MacNeille et al. | |
| 2016/0366643 | A1* | 12/2016 | Gustafsson | H04Q 9/00 |
| 2017/0032589 | A1 | 2/2017 | Zagajac et al. | |
| 2017/0053530 | A1 | 2/2017 | Gogic et al. | |
| 2017/0094716 | A1* | 3/2017 | Pogorelik | H04L 67/12 |
| 2017/0111256 | A1* | 4/2017 | Neal | H04L 43/08 |
| 2017/0184726 | A1* | 6/2017 | Lee | G01S 19/51 |
| 2017/0289733 | A1* | 10/2017 | Rajagopal | H04W 4/70 |

\* cited by examiner

INTERACTIVE SHARING OF VEHICLE SENSOR INFORMATION

CROSS-REFERENCE TO RELATED APPLICATION(S)

This application claims priority to and the benefit of provisional patent application No. 62/522,019 filed in the U.S. Patent and Trademark Office on Jun. 19, 2017, the entire content of which is incorporated herein by reference.

INTRODUCTION

Various aspects described herein relate to wireless communication and more particularly, but not exclusively, to sharing vehicle sensor information.

Wireless communication networks are widely deployed to provide various communication services such as telephony, video, data, messaging, broadcasts, and so on. Such networks, which are usually multiple access networks, support communication for multiple users by sharing the available communication resources.

Some networks enable vehicle-related communication. For example, a sensor device may broadcast information that it sensed (e.g., indicative of objects or conditions in the vicinity of the sensor). Nearby vehicles that receive the broadcast information may thereby determine whether to take action based on the sensed objects or conditions. The use of vehicle-related networks is expected to increase substantially. Consequently, there is a need for more effective techniques for sharing vehicle-related information.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method of communication including: generating a request for vehicle sensor information, wherein the generation of the request is based on at least one sensor capability of a responder; transmitting the request via a vehicle communication link; and receiving a response to the request via the vehicle communication link.

In some aspects, the disclosure provides an apparatus for communication, including: a memory and a processor coupled to the memory. The processor and the memory are configured to: generate a request for vehicle sensor information, wherein the generation of the request is based on at least one sensor capability of a responder; transmit the request via a vehicle communication link; and receive a response to the request via the vehicle communication link.

In some aspects, the disclosure provides an apparatus configured for communication. The apparatus including: means for generating a request for vehicle sensor information, wherein the generation of the request is based on at least one sensor capability of a responder; means for transmitting the request via a vehicle communication link; and means for receiving a response to the request via the vehicle communication link.

In some aspects, the disclosure provides a non-transitory computer-readable medium storing computer-executable code, including code to: generate a request for vehicle sensor information, wherein the generation of the request is based on at least one sensor capability of a responder; transmit the request via a vehicle communication link; and receive a response to the request via the vehicle communication link.

In some aspects, the disclosure provides a method of communication including: receiving a request for vehicle sensor information via a vehicle communication link; determining whether to respond to the request, wherein the determination is based on at least one sensor capability of the apparatus; generating a response to the request if the determination is to respond to the request, wherein the response comprises information sensed at a vehicle; and transmitting the response via the vehicle communication link.

In some aspects, the disclosure provides an apparatus for communication, including: a memory and a processor coupled to the memory. The processor and the memory are configured to: receive a request for vehicle sensor information via a vehicle communication link; determine whether to respond to the request, wherein the determination is based on at least one sensor capability of the apparatus; generate a response to the request if the determination is to respond to the request, wherein the response comprises information sensed at a vehicle; and transmit the response via the vehicle communication link.

In some aspects, the disclosure provides an apparatus configured for communication. The apparatus including: means for receiving a request for vehicle sensor information via a vehicle communication link; means for determining whether to respond to the request, wherein the determination is based on at least one sensor capability of the apparatus; means for generating a response to the request if the determination is to respond to the request, wherein the response comprises information sensed at a vehicle; and means for transmitting the response via the vehicle communication link.

In some aspects, the disclosure provides a non-transitory computer-readable medium storing computer-executable code, including code to: receive a request for vehicle sensor information via a vehicle communication link; determine whether to respond to the request, wherein the determination is based on at least one sensor capability of the apparatus; generate a response to the request if the determination is to respond to the request, wherein the response comprises information sensed at a vehicle; and transmit the response via the vehicle communication link.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
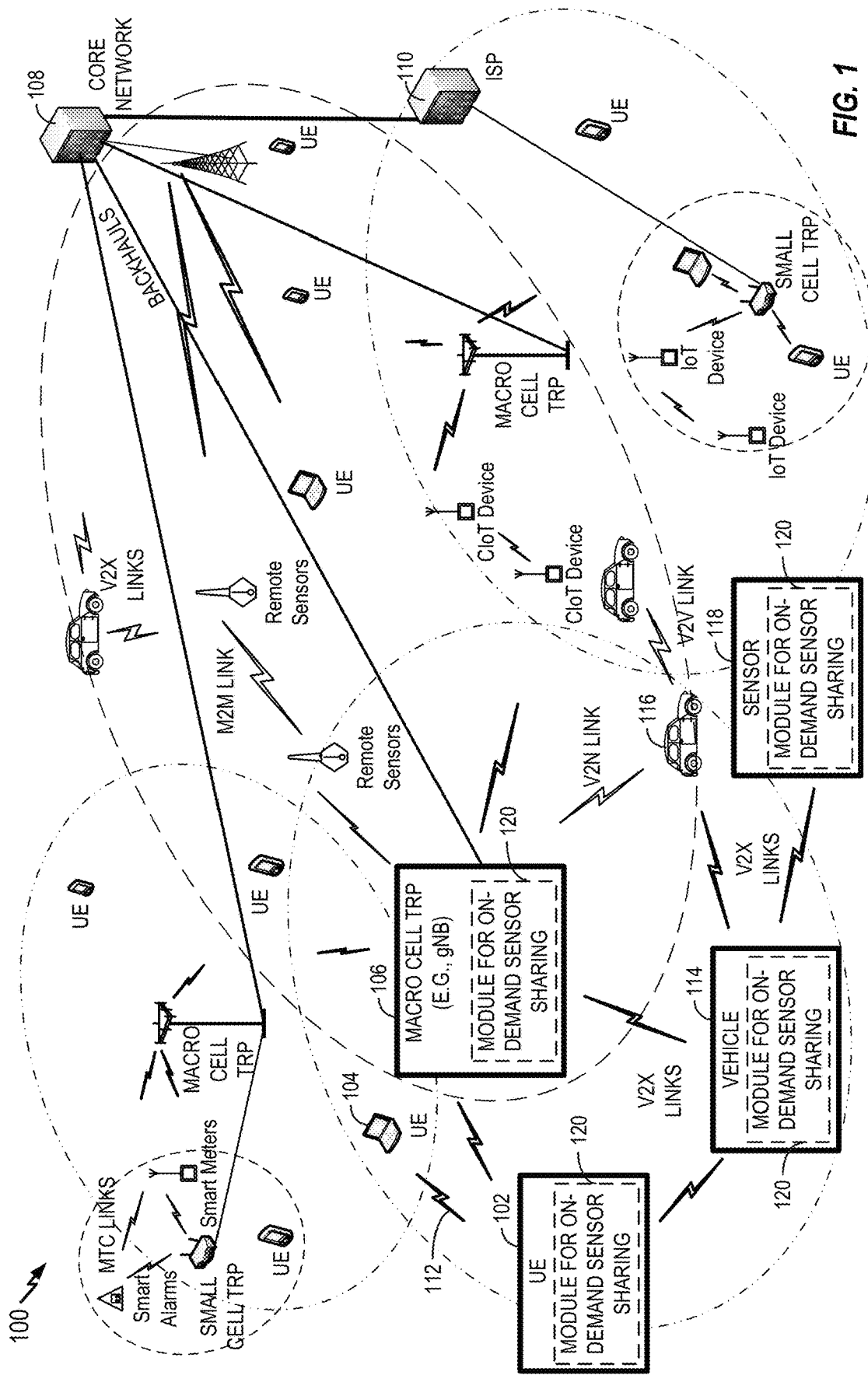
FIG. 1 is a diagram of an example communication system in which aspects of the disclosure may be used.

Various aspects of the disclosure relate to sharing vehicle sensor information. In some aspects, a requestor (e.g., a first vehicle) may transmit a request for vehicle sensor information. A responder (e.g., a second vehicle or a road-side sensor) may then respond with information sensed by the responder. For example, a requestor may unicast a vehicle-to-anything (V2X) message that requests a particular responder to share specified sensor information. As another example, a requestor may broadcast a vehicle-to-anything (V2X) message that requests any responder that meets a response criterion (or response criteria) to share specified sensor information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system, an LTE system, a V2X system, or a combination thereof. It should be appreciated, however, that the teachings herein may be used in other systems as well. Thus, references to functionality in the context of 5G terminology, LTE terminology, V2X terminology, or a combination thereof, should be understood to be equally applicable to other types of technology, networks, components, signaling, and so on.

Example Communication System

FIG. 1 illustrates an example of a wireless communication system 100 where a user equipment (UE), a vehicle, or some other type of device can communicate with other devices via wireless communication signaling. For example, a first UE 102 and a second UE 104 may communicate with a transmit receive point (TRP) 106 using wireless communication resources managed by the TRP 106 and/or other network devices (e.g., a core network 108, an internet service provider (ISP) 110, peer devices, and so on).

In some cases, devices of the system 100 may communicate with each other directly via a direct link 112 (e.g., a unicast link, a broadcast link, or a multicast link). A direct link may take the form of, for example, a vehicle-to-anything (V2X) link or a device-to-device (D2D) link. As shown in FIG. 1, a first vehicle 114 may communicate via V2X communication (or via a similar form of communication such as a vehicle-to-vehicle (V2V) communication or vehicle-to-network (V2N) communication) with a second vehicle 116, the UE 102, a sensor 118 (e.g., a road-side device), the TRP 106 (e.g., a gNB), or some other device (e.g., component) of the system 100.

In accordance with the teachings herein, devices of the system 100 may include functionality for sharing sensor information. For example, each of the first vehicle 114, the second vehicle 116, the UE 102, the sensor 118, and the TRP 106 may include a module for on-demand sensor sharing 120. The specific functionality of the module for on-demand sensor sharing 120 may be different for different devices. For example, a sensor device might only respond to requests, a vehicle might send requests and/or respond to requests, a gNodeB might configure devices to issues requests and/or response, and so on.

The devices and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of links may be supported in the wireless communication system 100. For example, D2D links may include, without limitation, machine-to-machine (M2M) links, MTC links, V2V links, and V2X links. Network-to-device links may include, without limitation, uplinks (or reverse links), downlinks (or forward links), V2N links, and V2X links. Broadcast links may include, without limitation, V2V links, V2X links, M2M links, and MTC links. In some aspects, V2V and V2N communication may be considered as examples of V2X communication.

Example Communication Components

Figure 2:
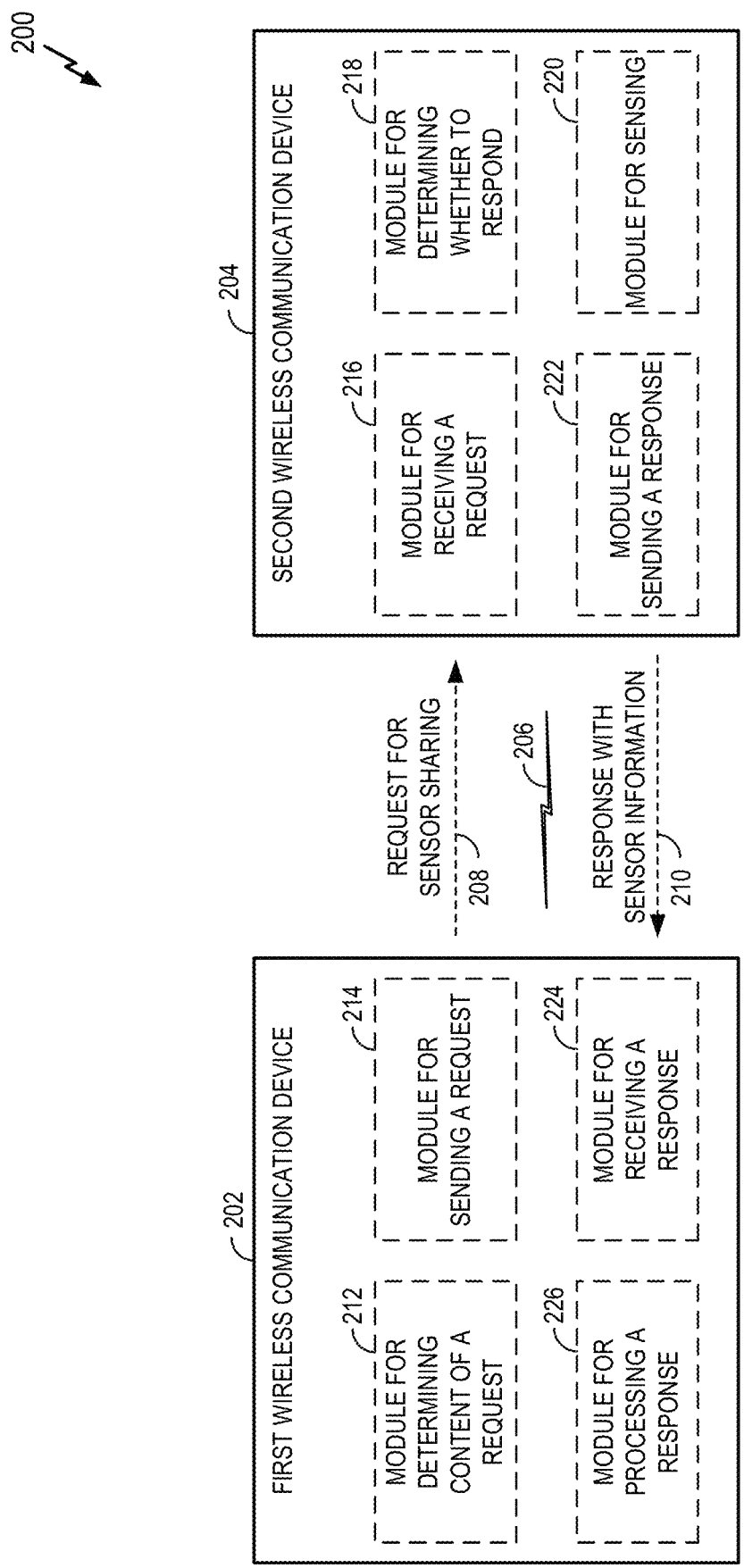
FIG. 2 is a block diagram of example communication components in accordance with some aspects of the disclosure.

FIG. 2 illustrates another example of a wireless communication system 200 where a first wireless communication device 202 communicates with a second wireless communication device 204 via a wireless communication link 206. For example, the first wireless communication device 202 may be in a first vehicle and the second wireless communication device 204 may be in a second vehicle or a road-side device. The communication link 206 may take the form of, for example, a V2X link, an enhanced V2X (eV2X) link, or some other suitable communication link (e.g., a V2V link, a V2N link, a D2D link, etc.).

The devices of the wireless communication system 200 may access other peer communication devices, other communication devices of an associated wide area network, or communication devices in other networks (not shown). To reduce the complexity of FIG. 2, only two devices are shown. In practice, a wireless communication system may include more of these devices. In some implementations, the first wireless communication device 202 may correspond to the first vehicle 114 of FIG. 1. In addition, the second wireless communication device 204 may correspond to the second vehicle 116, the sensor 118, the UE 102, or some other device of FIG. 1.

At some point in time, the first wireless communication device 202 may transmit a request for sensor sharing 208 via unicast signaling (e.g., to the second wireless communication device 204), broadcast signaling, or some other form of signaling. For example, the first wireless communication device 202 may determine that an object (e.g., a vehicle) is blocking a field-of-view (FOV) of the first wireless communication device 202. Accordingly, the first wireless communication device 202 may attempt to obtain sensor information from at least one other device (e.g., that may be able to sense the blocked FOV or provide other information of interest). Under certain circumstances, the second wireless communication device 204 may transmit a response with sensor information 210 via unicast signaling (e.g., to the first wireless communication device 202), broadcast signaling, or some other form of signaling.

The first wireless communication device 202 includes several components for generating a request. A module for determining content of a request 212 determines, for example, the sensor information to be requested. An example of this functionality is described in more detail below in conjunction with FIG. 3. A module for sending a request 214 sends the request for sensor sharing 208 including, for example, an indication of the sensor information to be included in the response.

The second wireless communication device 204 includes several components for processing the request. A module for receiving a request 216 receives the request for sensor sharing 208. A module for determining whether to respond 218 determines whether the second wireless device 204 should respond to the request. For example, the module for determining whether to respond 218 may determine whether the request for sensor sharing 208 specifies that the second wireless device 204 is to respond. As another example, the module for determining whether to respond 218 may determine whether the second wireless device 204 is able to meet a response criterion specified by the request for sensor sharing 208. An example of this functionality is described in more detail below in conjunction with FIG. 4.

The second wireless communication device 204 includes several components for generating a response to the request. For example, prior to and/or after receiving the request for sensor sharing 208, a module for sensing 220 may sense one or more traffic-related conditions (e.g., a condition that a vehicle should take into account prior to moving or when it is moving). As one example, the module for sensing 220 may sense a FOV for objects (e.g., vehicles, pedestrians, or other objects). If a response is warranted, a module for sending a response 222 may send the response with sensor information 210 (e.g., the information specified by the request).

The first wireless communication device 202 includes several components for handling the response. A module for receiving a response 224 receives the response with sensor information 210. A module for processing a response 226 may then process the sensor information included in the response to determine an appropriate course of action. For example, the module for processing a response 226 may generate a control signal to control a vehicle (e.g., stop, slow down, turn, accelerate, etc.), generate an alarm signal (e.g., to a passenger or driver of a vehicle), or take no action.

Example Processes

Figure 3:
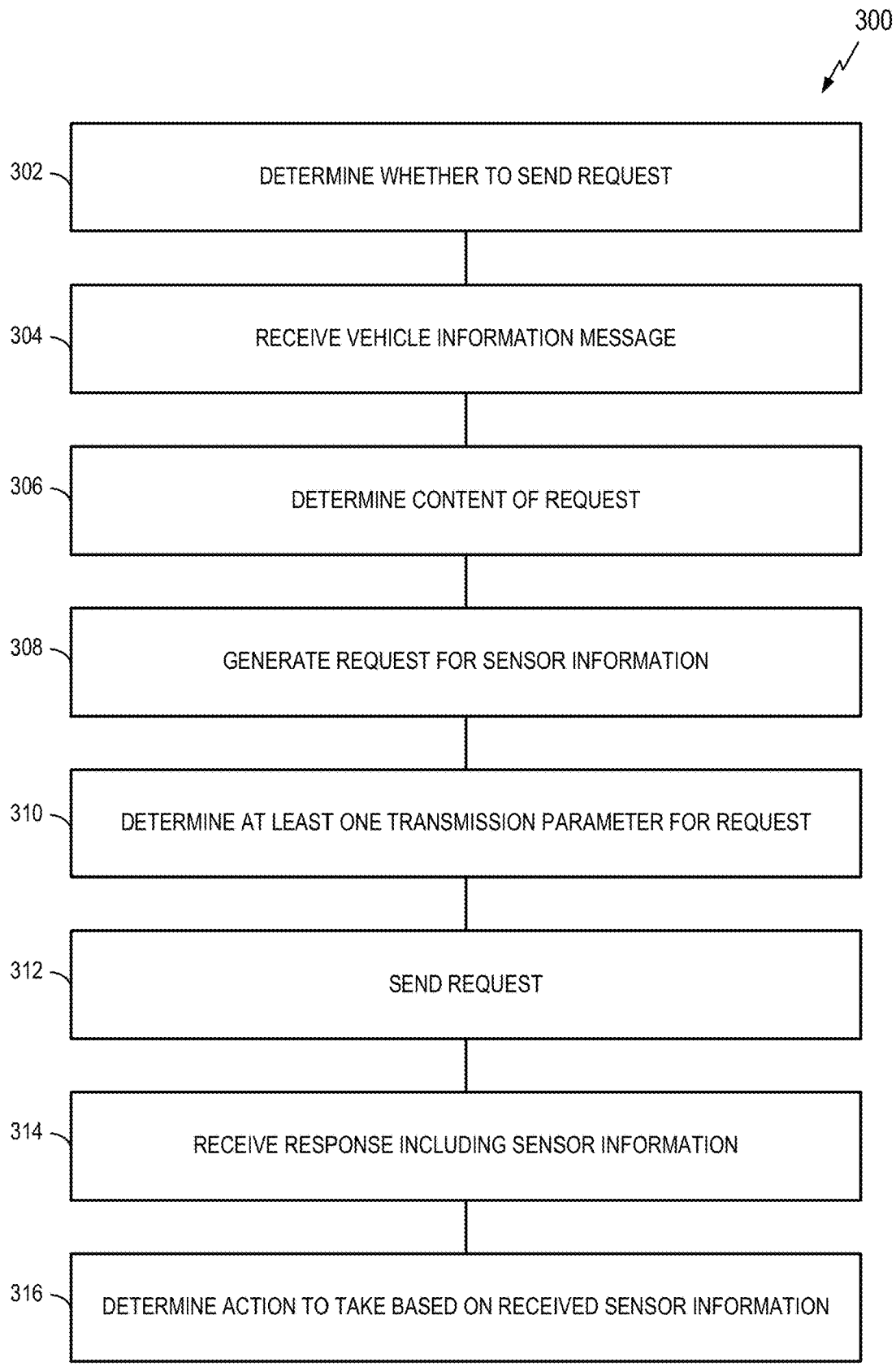
FIG. 3 is a flowchart illustrating an example of a request process in accordance with some aspects of the disclosure.
Figure 4:
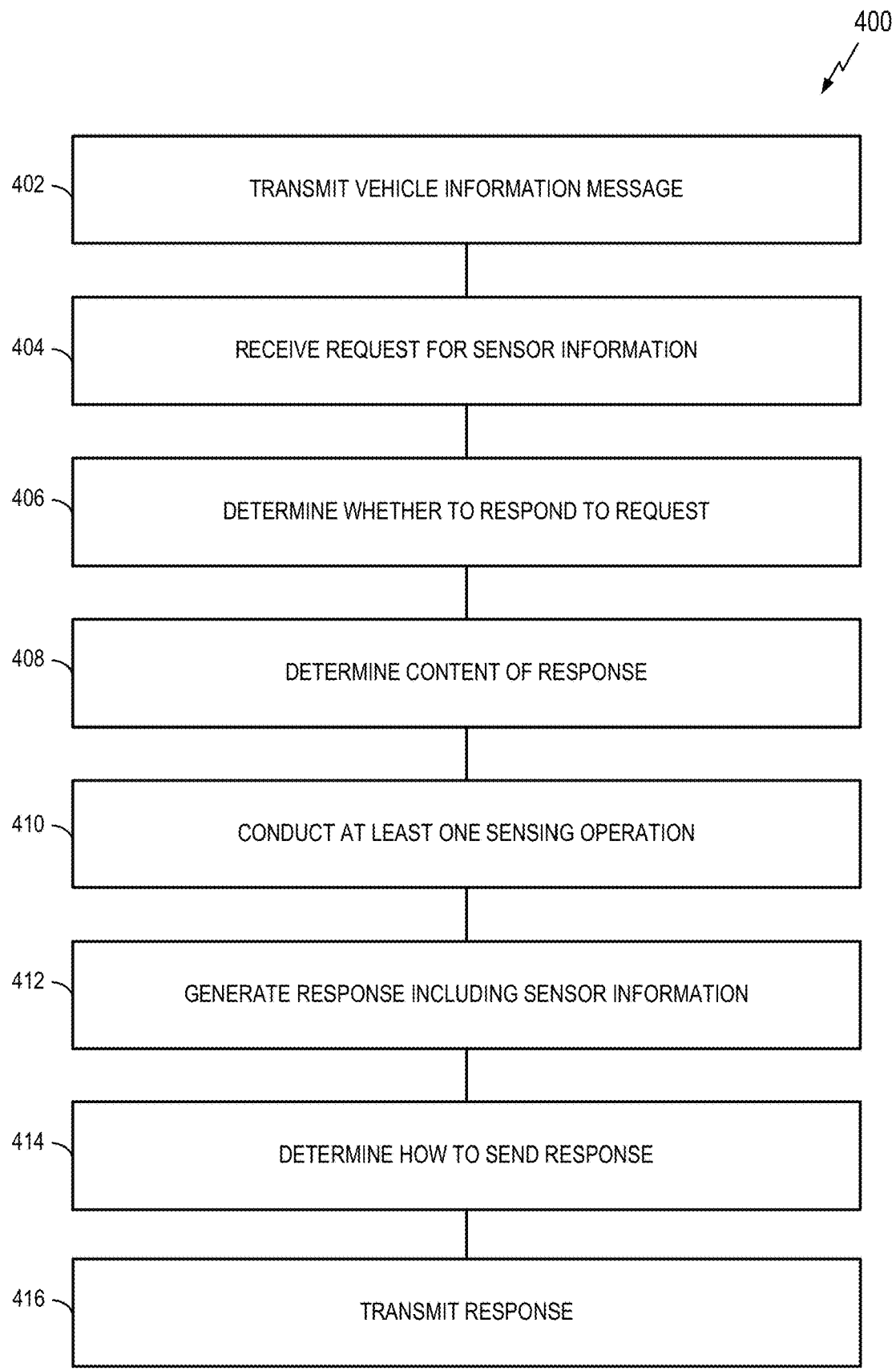
FIG. 4 is a flowchart illustrating an example of a response process in accordance with some aspects of the disclosure.

Various aspects of request-response operations in accordance with the teachings herein will now be described with reference to FIGS. 3 and 4. FIG. 3 describes several operations relating to generating a request. FIG. 4 describes several operations relating to generating a response to a request.

FIG. 3 illustrates a process 300 for communication in accordance with some aspects of the disclosure. The process 300 may take place within a processing circuit (e.g., the processing circuit 1410 of FIG. 14), which may be located in a UE, a vehicle, a road-side device, an access terminal, a gNB, a TRP, a base station, or some other suitable apparatus. Of course, in various aspects within the scope of the disclosure, the process 300 may be implemented by any suitable apparatus capable of supporting communication-related operations.

At block 302, an apparatus (e.g., a UE) determines whether to send a request. For example, the apparatus may determine that a FOV of the apparatus is blocked. In this case, the apparatus may send a request in an attempt obtain sensor information for that FOV from another apparatus.

In some aspects, the apparatus may determine whether the sensor information it would request has recently been reported over-the-air (OTA). For example, the apparatus may monitor responses sent OTA (e.g., in response to a request from another apparatus) to determine whether one or more of those responses contains the information desired by the apparatus. If so, the apparatus may elect to not send the request.

At block 304, the apparatus receives a vehicle information message. For example, the apparatus may monitor for periodic basic safety messages (BSMs) and/or cooperation awareness messages (CAMs) sent by nearby apparatuses. For convenience, a BSM and/or a CAM may be referred to herein simply as a BSM/CAM. In some cases, a vehicle information message may indicate at least one capability of the sending apparatus (e.g., types of sensors supported, available FOVs, etc.). In some cases, this message may include an indication of a radio access technology (RAT) capability of the sender, an indication of at least one time at which the sender monitors for requests, an indication of at least one resource on which the sender monitors for requests, or any combination thereof. In some cases, this message may include an identifier of the sender, security information associated with the sender, an indication of the location of the sender, or a combination of this information. In some cases, the apparatus may map this identifier of the sender to a V2X identifier of the sender (e.g., sent in the request) to reference, via the request, information contained in the vehicle information message (e.g., a BSM and/or a CAM). As discussed herein, the apparatus may use this information to formulate the request (e.g., to determine whether to send the request and/or to determine how to formulate the request).

In some aspects, the apparatus may measure the received message signal (e.g., measure the received signal power or signal-to-noise ratio) or conduct some other type of measurement to estimate the channel (e.g., a band corresponding to a particular carrier frequency). As discussed herein, the apparatus may use this measurement information to formulate the request (e.g., to determine whether to send the request and/or to determine how to formulate the request).

At block 306, the apparatus determines the content of the request. For example, the apparatus may select which information is to be included in the request.

In some aspects, the request may specify the information to be sent in a response. For example, the request may specify at least one type of sensor information being requested, reference position information, a period of interest, at least one sensor type, at least one sensor identifier, at least one requested object type, at least one zone of interest, or any combination thereof.

In some aspects, the request may indicate at least one of: a schedule for responding to the request, at least one transmission parameter for responding to the request, a radio access technology (RAT) to be used for responding to the request, a carrier frequency to be used for responding to the request, a vehicle-to-anything communication identifier associated with the apparatus, a cooperative awareness message (CAM) station identifier associated with the apparatus, a basic safety message (BSM) station identifier associated with the apparatus, or any combination thereof.

In some aspects, the content of the request may be based on one or more characteristics of a potential responder (e.g., as determined from the message received at block 304). For example, one or more of the identifier, the location, or the sensor capability information of a potential responder may indicate whether the potential responder can measure information of interest to the apparatus.

As a specific example, the content of the request may be based on the relative locations of the requestor and the responder. For example, if a potential responder is blocking a FOV of the requestor, the apparatus may request sensed information from the blocked FOV.

If the request is to be sent via broadcast or multicast signaling, the content of the request may specify at least one criterion for responding to the request. For example, the request may specify that only those responders that include certain sensors, or that sense a particular location (or FOV), are to respond to the request.

In some aspects, the content of the request may be based on at least one lower layer transmission characteristic. For example, the apparatus may measure a lower layer transmission characteristic and, if the lower layer transmission characteristic indicates that channel conditions are poor, a smaller sensor information payload may be requested.

In some aspects, the content of the request may include at least one lower layer transmission characteristic. For example, the request may specify at least one lower layer transmission characteristic to be used by a responder to send the response.

In some cases, the apparatus may include a mapping to a vehicle information message (e.g., a BSM and/or a CAM) in the request. For example, the apparatus may include a CAM identifier of the sender of a CAM mapped to a V2X identifier of the sender. In this way, the apparatus may reference, via the request, information contained in the CAM.

In some cases, the apparatus may determine whether the request will include or reference security information (e.g., used by a responder to verify that the requestor is trusted). For example, in some cases, the request may include security information to be used by the responder to protect the response message sent back to the requester.

At block 308, the apparatus generates the request for sensor information. The generated request may include one or more information containers for the above information (e.g., identifying specific sensor information to be reported).

At block 310, the apparatus determines at least one transmission parameter to be sent in the request, to be used by the responder. For example, the apparatus may select the modulation and/or coding for the response based on a channel estimate derived from measurement of the vehicle information message received at block 304 or based on some other measurement.

At block 312, the apparatus sends the request. For example, the apparatus may transmit a V2X message over-the-air (OTA) via unicast signaling (e.g., to the apparatus of FIG. 4), via broadcast signaling, or via multicast signaling.

At block 314, the apparatus receives a response to the request (e.g., from the apparatus of FIG. 4). This response may include the sensor information requested by the request.

At block 316, the apparatus determines at least one action to be taken based on the received sensor information. For example, the apparatus may generate a control signal to control a vehicle and/or generate an alarm signal. Alternatively, the apparatus may take no action (or not take a corrective action) if there is nothing of concern found in the sensor information (e.g., no hazardous objects or conditions in the projected path of a vehicle).

In some aspects, a process according to the teachings herein may include any combination of the operations and/or features described above for FIG. 3.

FIG. 4 illustrates a process 400 for communication in accordance with some aspects of the disclosure. The process 400 may take place within a processing circuit (e.g., the processing circuit 1610 of FIG. 16), which may be located in a road-side device, a UE, a vehicle, an access terminal, a gNB, a TRP, a base station, or some other suitable apparatus. Of course, in various aspects within the scope of the disclosure, the process 400 may be implemented by any suitable apparatus capable of supporting communication-related operations.

At block 402, an apparatus (e.g., a UE) transmits a vehicle information message. For example, the apparatus may periodically send a basic safety message and/or a cooperation awareness message. In some cases, this message may indicate at least one capability of the apparatus (e.g., types of sensors supported, available FOVs, etc.). In some cases, this message may include an indication of a radio access technology (RAT) capability of the apparatus, an indication of at least one time at which the apparatus monitors for requests, an indication of at least one resource on which the apparatus monitors for requests, or any combination thereof. In some cases, this message may include an identifier of the apparatus, security information associated with the apparatus, an indication of the location of the apparatus, or a combination of this information.

At block 404, at some point in time, the apparatus receives a request for sensor information. For example, the apparatus may receive a V2X message that was unicast, broadcast, or multicast by another apparatus (e.g., the apparatus of FIG. 3). As discussed above in conjunction with FIG. 3, the request may specify the information to be sent in a response. As also discussed above in conjunction with FIG. 3, the request may indicate at least one of: a schedule, at least one transmission parameter, a radio access technology (RAT), a carrier frequency, a vehicle-to-anything communication identifier, a cooperative awareness message (CAM) station identifier, a basic safety message (BSM) station identifier, or any combination thereof.

At block 406, the apparatus determines whether to respond to the request. For example, if the request is a unicast message, the apparatus may determine whether the request is directed to the apparatus. As another example, if the request is a broadcast message, the apparatus may determine whether the apparatus is able to meet a response criterion specified by the request. For example, the request may specify that only apparatuses that are able to provide particular sensor information (e.g., a particular FOV) are to respond to the request.

In some cases, the apparatus may determine whether the request includes or references appropriate security information for invoking a response. For example, in some cases, the request may include security information that is based on security information associated with the vehicle information message sent at block 402. As another example, in some cases, the request may reference security information associated with the vehicle information message sent at block 402 (e.g., the request might not include its own security header).

In some cases, the apparatus may determine whether another apparatus has sent the requested information. For example, the apparatus may monitor for responses from other apparatuses to determine whether at least one response transmitted by another apparatus (e.g., transmitted within a threshold period of time prior to the current time) includes the sensor information requested by the request. If so, the apparatus may refrain from responding.

At block 408, if the apparatus is to respond to the request, the apparatus determines the content of the response. For example, the apparatus may determine which categories of the requested sensor information the apparatus is able to sense (or has sensed).

In some aspects, the content of the response may be based on the relative locations of the requestor and the responder. For example, if the apparatus is blocking a FOV of the requestor, the apparatus may include sensed information from the blocked FOV in the response. In addition, the content of the response may be based on a transmission parameter. For example, if a higher transmission rate is supported, a more accurate or higher definition of the sensing data could be included in the response. In some cases, the response may reference security information associated with the request (e.g., the response might not need its own security header).

At block 410, the apparatus conducts at least one sensing operation. For example, the apparatus may sense for objects and generate sensor information based on this sensing. This sensing may occur before and/or after receiving the request at block 404.

At block 412, the apparatus generates a response including sensor information. For example, the sensor information included in the response may be the sensor information generated at block 410. As another example, the sensor information included in the response may include sensor-related information determined (e.g., generated) at block 408 (e.g., information relating to the sensing by the apparatus).

At block 414, the apparatus determines how to send the response. In some aspects, this may involve determining at least one transmission property for the transmission, determining which radio access technology (RAT) is to be used for the response (e.g., NR technology, millimeter wave (mmW) technology, 4G technology, or some other technology), determining whether to send the response via unicast, broadcast, or multicast signaling.

In some aspects, the apparatus may measure the request signal (e.g., measure the received signal power or signal-to-noise ratio) or conduct some other type of measurement to estimate the channel (e.g., a band corresponding to a particular carrier frequency) quality and load. The apparatus may then select the modulation and/or coding for the response based on the channel estimate.

In some aspects, the apparatus may determine whether there is another channel (e.g., carrier frequency) that had better quality than the channel upon which the request was received. If so, the apparatus may elect to send the response via the better channel (e.g., carrier frequency).

In some aspects, the apparatus may determine which type of RAT is preferred for sending the response. For example, the apparatus may use mmW technology for unicast signaling, but not for broadcast signaling.

In some aspects, the apparatus may determine how to send the response based on information included in the request. For example, the request may specify at least one transmission parameter to be used for the response. Such a transmission parameter may include, for example, a carrier frequency, modulation, coding, physical layer resource blocks, a multiple-input multiple-output (MIMO) configuration, or any combination thereof.

In some aspects, the apparatus may determine how to send the response based on the content of the response. For example, the apparatus may adjust the rate depending on the size of the response payload.

In some aspects, the apparatus may determine how to send the response based on whether the sensor information in the response has been requested by more than one requestor. For example, if the information has been requested by more than one requestor, the apparatus may elect to broadcast or multicast the response. Otherwise the apparatus may unicast the response.

At block 416, the apparatus transmits the response. As discussed above, this may involve unicast signaling, broadcast signaling, or multicast signaling.

In some aspects, a process according to the teachings herein may include any combination of the operations and/or features described above for FIG. 4.

V2X Communication

For purposes of illustration, various aspects of the disclosure will be described in the context of V2X communication. It should be appreciated, however, that the teachings herein are not limited to V2X communication. Thus, it should be understood that references to V2X (e.g., including eV2X) communication herein may be equally applicable to other types of communication.

Release 15 (Rel-15) of enhanced V2X (eV2X) communication supports extended sensors (e.g., sensor sharing). In some aspects, it may be useful to enable advanced vehicle driving through the use of sensor sharing over an eV2X system, instead of retrofitting vehicles with a large number of sensors. Use of eV2X communication may also be useful for cooperative sensing by providing complementary information from other points-of-view (PoVs). Accordingly, better accuracy may be achieved and/or local sensor inputs can be validated for more reliable driving control.

Existing V2X sensor sharing techniques are based on a blind broadcast mechanism. Specifically, a vehicle simply broadcasts sensor information (e.g., information about detected objects) to enable nearby vehicles to obtain the information.

However, blind broadcast does not meet the needs of advanced driving and eV2X communication. For example, high data rate blind broadcast from all vehicles may be unsustainable within the available Intelligent Transport System (ITS) spectrum. In addition, there is a waste of resources and energy when there is no vehicle nearby that needs this broadcast information. Also, the efficiency of the transmissions may be relatively low due to the use of a blind broadcast (e.g., modulation, coding, etc., might not be optimized). Furthermore, the contents of the sensor data are not optimized. Blind broadcast involves sending everything. Thus, scale, content, and accuracy are not adjusted. Moreover, broadcast might not be suitable for new radio access technologies (RATs) such as, for example, NR technology and millimeter wave (mmW) technology.

Interactive Sensor Sharing

The disclosure relates in some aspects to interactive operations for eV2X to support customized sharing of sensor information (which may simply be referred to as sensor sharing herein). The sensor sharing may be interactive in terms of contents (e.g., on-demand, adjustable, schedulable, or any combination thereof). The sensor sharing may be dynamic (e.g., requested and/or sent as needed). The sensor sharing may be interactive in terms of access stratum (AS). For example, transmit operations and/or receive operation (Tx/Rx) can be optimized with point-to-point (or group) communication.

Modes of Interactive Sensor Sharing (Request/Response)

Figure 5:
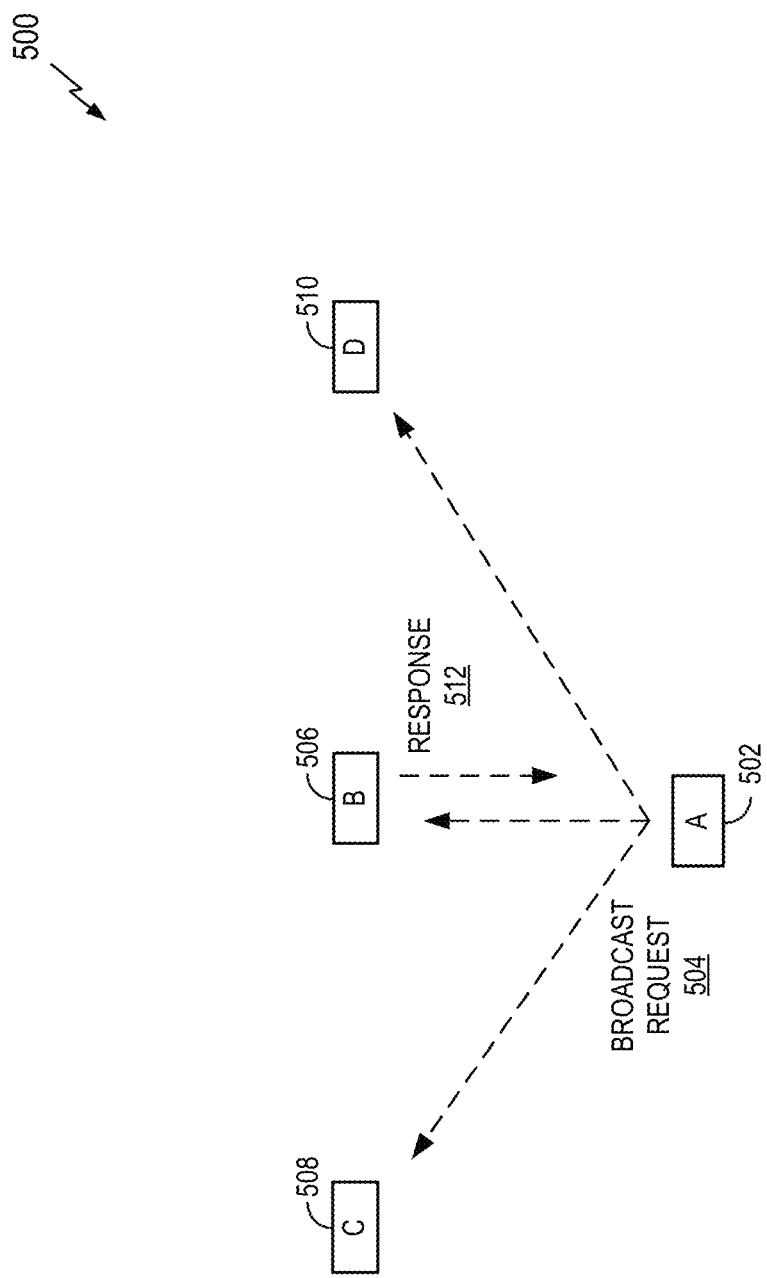
FIG. 5 is a diagram illustrating an example of broadcasting or multicasting a request in accordance with some aspects of the disclosure.
Figure 6:
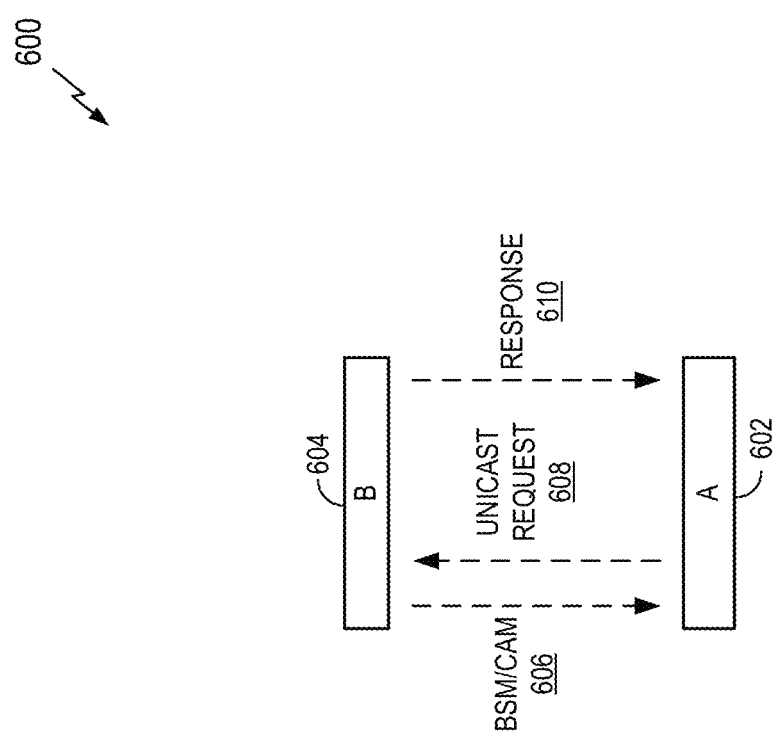
FIG. 6 is a diagram illustrating an example of unicasting a request in accordance with some aspects of the disclosure.

FIGS. 5 and 6 illustrate two examples of Request/Response sensor sharing models. The devices depicted in FIGS. 5 and 6 may correspond to one or more of the devices of FIGS. 1 and 2.

FIG. 5 illustrates a broadcast or multicast model 500. Here, a device A 502 (e.g., a UE) broadcasts a request 504. The request indicates the criteria for sharing as discussed herein.

Three devices, a device B 506, a device C 508, and a device D 510 receive the request. In this example, only the device B 506 (e.g., a UE) matches the criteria. Therefore, the device B 506 sends a response with sensor data 512. Here, the upper layer protocol at the device B 506 may decide on the response (e.g., determine whether and/or how to respond), and a lower layer protocol at the device B 506 may decide the transmission optimization (e.g., how to transmit the response) for the response to the device A 502.

FIG. 6 illustrates a unicast model 600. Here, a device A 602 (e.g., a UE) unicasts a request to a device B 604 (e.g., a UE).

As indicated, the device B 604 may transmit a BSM/CAM 606, or any other periodic broadcast messages known to nearby vehicles and/or devices. Utilizing the BSM/CAM 606 and/or other previously received information, the device A 602 identifies the device B 604, and sends a unicast request 608.

The device B 604 responds with a unicast response 610. The response 610 includes the sensor information requested by the request 608.

One or both of the device A 602 and the device B 604 can optimize the transmission of the response 610 by the device B 604. In addition, the device A 602 can optimize the reception of the response 610.

CAM/BSM Messages and Congestion Control

In view of the above, the disclosure relates in some aspects to using periodic V2X BSM/CAM information (or other periodic broadcast messages known to nearby vehicles and/or devices), and linking this information with a request message to customize the V2X sensor sharing with respect to the content of the messages (e.g., application layer contents) and the transmission of the messages (e.g., lower layer transmissions). In some aspects, sensor sharing contents may be generated based on lower layer transmission characteristics. In some aspects, sensor sharing contents may be generated based on relative locations of the UEs (e.g., where the locations may be derived from the BSM/CAM information). In addition, the transmission of the sensor data may be customized and/or optimized based on information exchanged in a BSM/CAM and in a request message.

The disclosure relates in some aspects to reusing information already present in the CAM/BSM periodic messages to reduce message contents for sensor sharing. This information may include at least, for example, location information and a security header.

The disclosure also relates in some aspects to congestion control schemes to further reduce the number of messages needed for sensor sharing. For example, requests and/or responses might not be sent if the sensor information to be requested is already being sent OTA.

Model 1: Broadcast (or Multicast) Request and Unicast Response

The use of a broadcast (or multicast) request may have one or more advantages. In some aspects, the use of such a request may reduce the resources used for transmitting the sensor information in the response. For example, this sensor information might only be sent when requested. The use of such a request may also reduce the contents contained within the response. For example, a responder might only send the requested information and/or matched objects. Furthermore, the transmission of the response may be optimized. For example, information about a receiver that will receive the response may be obtained via a request. Several example operational details follow.

At a first step, a Vehicle A broadcasts a request for sensor data.

At the eV2X layer, the request message may include a Layer 2 (L2) identifier (ID) used for generating the unicast response. This destination identifier may be a unicast L2 ID defined for eV2X, taken from the request message's source identifier.

The request message may also include an ITS Packet Data Unit (PDU). This PDU may have a header and a payload.

The header may include a new message type: collective perception message (CPM) request. The header may include an identifier such as a station ID (e.g., a vehicle temporary ID) used in CAM or BSM to link security and location information, etc.

The payload may include a V2X communication container that can be used for customizing the transmission response back to Vehicle A. For example, customizing the transmission response may involve customizing the channel, the modulation/coding, the modulation and coding scheme/resource blocks (MCS/RBs), the multiple-input multiple-output (MIMO) settings, the packet delay budget (PDB) for receive operations, other aspects of the transmission, or any combination thereof.

The payload may include a security container. The security container may be used in the event a device requests lower layer protection for the response.

The payload may include a perception request container. The perception request container may include a Delta Reference Position, a Period of Interest, a Sensor Data Filter, or any combination thereof.

The Delta Reference Position may be used to adjust (if needed) the sensor sharing reference position with respect to (w.r.t.) the vehicle position communicated in the BSM/CAM.

The Period of Interest may indicate the amount of time the sensor information is needed. For example, the information may be needed one time or for a period of time (e.g., in milliseconds, ms). The time period could be represented in absolute time or as a relative time (e.g., in reference to UTC or the current frame, etc.).

The Sensor Data Filter may include information about a Sensor Type, a Sensor ID, a Type of Object Requested, a Zone of Interest, or any combination thereof.

The Sensor Type and/or the Sensor ID may indicate, for example, that only LIDAR sensors are to be used, only processed objects are to be used, other sensor criteria, or any combination thereof.

The Type of Object Requested may include, for example, all objects or a specific type of item (e.g., pedestrians, animals, traffic signs, objects larger than X inches, dynamic objects, etc.).

The Zone of Interest may indicate, for example, that data from front facing sensors is to be reported, that data from side facing sensors is to be reported, that data from a certain zone described by 3-dimensional (3D) coordinates is to be reported, that information in some other zone is to be reported, or any combination thereof.

At a second step, Vehicle B receives the request and generates a response (e.g., based on upper layer control). For example, Vehicle B may store eV2X layer parameters and use them for transmitting a response to Vehicle A. The mapping of Station ID and L2 ID may be created and stored for a period of interest.

Vehicle B may then transmit the response to Vehicle A via a unicast message. As discussed herein, the response may be based on stored information such as the L2 ID, V2X parameters, etc. The access stratum (AS) layer may accept V2X parameters passed down with the response.

The following issues and solutions may be applicable for Model 1 operation.

First, three solutions for Model 1 operation follow for avoiding channel flooding due to too many requests (and thus too many responses).

In a first solution (Solution 1), each vehicle (e.g., Vehicle A) intending to request sensor information also monitors request messages sent by other vehicles. If the sensor information (e.g., sensor data filter) previously requested by another vehicle already covers Vehicle A's needs, and the V2X parameters do not conflict with Vehicle A's V2X parameters, Vehicle A could make use of the information from the request Vehicle A receives from the requesting vehicle to tune for a response to that request (e.g., using the L2 ID, V2X parameters, etc.) and thereby receive that response correctly.

In a second solution (Solution 2), if a vehicle receives several requests for largely the same set of data, the vehicle may evaluate the requests (e.g., based on the "communication parameters" from each sender) to determine whether a broadcast (or multicast) request or a unicast response should be used. If a broadcast (or multicast) response is selected, the vehicle selects the communication parameters to use to communicate the response efficiently (e.g., in the least stringent manner). Thus, a responding vehicle can switch from a unicast response to a broadcast (or multicast) response if there are a large number of requesters (e.g., the number of requesters meets or exceeds a threshold number).

In a third solution (Solution 3), a vehicle receives a request in one channel, but sends a response in another channel (e.g., a less used channel). The available response channel (and/or the request channel) may be indicated in the BSM/CAM message. The request message can indicate which response channel the receiver should choose.

Second, two solutions for Model 1 operation follow for optimizing a requester's receive operation if there are multiple potential responders.

In a first solution (Solution 1), Vehicle A includes in the V2X parameters certain information such that Vehicle A can estimate the response transmission time and, therefore, only needs to tune to do a receive operation up to the scheduled time. This information may include, for example, the packet delay bound (PDB) or a time schedule for the response.

In a second solution (Solution 2), based on the BSM/CAM, Vehicle A knows the nearby vehicles, and assigns a corresponding index to each of them in the request, indicating when to respond, within which frame or transmission time interval (TTI) to respond, the radio resources to use for the response, or any combination thereof. The responder generates the response transmission schedule based on the index and schedule, such that Vehicle A will know when it needs to monitor for responses, and how many vehicles will respond. Vehicle A could prioritize the reception in the case of a collision of responses (e.g., in the time domain).

Third, a solution for Model 1 operation follows to optimize Vehicle B's transmission of the response. Initially, Vehicle B performs a measurement of the request. Then, based on the V2X parameters, Vehicle B decides the optimal transmission characteristics for a transmission back towards Vehicle A.

Model 2: Unicasted Request and Response

Model 2 uses a 2-way handshake of request and response to set up a unicast link. In some aspects, this approach may achieve much higher throughput and better transmit and receive control. Several example operational details follow.

In a first operation, based on the BSM/CAM, Vehicle A discovers, for example, Vehicle B's position, capability, and sensors to share. This may involve use of objects (e.g., extended objects) in the BSM/CAM and/or other messages (e.g., periodic messages) including information such as: location, dimension, path, sensor list, capability, etc. L2 IDs and the Station ID used in the BSM/CAM may be used for requests. Therefore, Vehicle A may store this mapping.

In a second operation, Vehicle A generates a unicast request based on the above information. For example, Vehicle A may decide that Vehicle B has blocked its view, and thus requests a camera feed of this direction.

Vehicle A uses the stored information (described above) to transmit the request. For example, Vehicle A may use the L2 ID, the Station ID, security materials from BSM/CAM, and the sensor list to send the request.

Vehicle A may perform a measurement of the BSM/CAM at the physical layer and store this measurement information to later decide which transmit parameters are to be used. This measurement might not be sufficient in some scenarios. In some aspects, this measurement could provide the coarse transmit parameters for the initial request/response, which in turn tune the transmit operation and/or receive operations for further transactions (e.g., during the request and response).

The request message content for Model 2 can be similar to the request message content for Model 1 discussed above.

In a third operation, Vehicle B generates a response based on the received request. Vehicle B may transmit the response to Vehicle A based on stored information and/or the information from the request. Vehicle A can indicate in the request the specific transmission parameters to be used for the response. Vehicle B can also indicate in the response whether an acknowledgement (ACK) is needed for reliable retransmission.

The following issues and solutions may be applicable for Model 2 operation.

First, if there are too many requests of the same content, Vehicle B can convert the actual response content into a broadcast (or multicast) delivery (e.g., as discussed above for Model 1). Therefore, the response could be a broadcast response, or a simple pointer to the actual broadcast content and any relevant parameters needed to receive this content.

Second, a three-step solution for handling upper layer and lower layer interactions in transmit operations and/or receive operations with multi-RAT PC5 operation follows. Here, application layer messaging may be used to carry V2X lower layer information to set up an optimized link (e.g., the V2X layer serves as a simplified Radio Resource Control (RRC) layer for V2X).

In a first step, in a BSM/CAM message, at a V2X layer message layer below the application layer (e.g., in a "opaque blob"), Vehicle B can indicate its RAT capability (e.g., LTE V2X, LTE eV2X, NR eV2X, etc.). Vehicle B can also indicate where it listens for requests and the carrier on which it listens for requests.

In a second step, Vehicle A builds a mapping table of Vehicle B's IDs and corresponding parameters for sending the request at the upper layer. When sending a request message down, the upper layer retrieves the corresponding profile and passes this down to a lower layer together with the request message. The lower layer follows the profile information in sending the request to Vehicle B. Vehicle A also includes its RAT information in the request for Vehicle B to send the corresponding response.

In a third step, Vehicle B's upper layer includes the RAT information when passing the response down. The lower layer follows the RAT information to transmit the response to Vehicle A. RAT information could be represented in the form of QoS/KPI/5QI as well. For a trigger, this layer or the application layer can set the parameters in this blob to be transported in the application layer BSM/CAM.

Linking of BSM/CAM to Standalone Request/Response Message

A standalone Collective Perception Message (CPM) may contain an ITS PDU header of its own (e.g., European Telecommunications Standards Institute (ETSI) ITS defined format for CPM includes a standalone option). A CPM also may contain an ITS PDU header. This header may contain a "Station ID" 4-byte field, which may change. For both CAMs and BSMs, the Station ID may be derived from the ID of the certificate in the security layer header of the message, e.g., HashedId8 (8 bytes). A BSM may contain a "Temporary ID", which may be an identifier of the vehicle (e.g., a Station ID), and associated with the certificate used to sign the BSM. This Temporary ID or its hash can be used in the sensor sharing message as well.

The disclosure relates in some aspects, to using the Station ID of the CAM message in the Request/Response (CPM) from the same vehicle (for a period of a few minutes). This can result in proper linking of the CAM and CPM messages, and reduce overlapping contents in CPM (e.g., location, vehicle size, speed, direction, path, etc.). Reuse of the security component may reduce the CPM message sizes. The security header of an ETSI_ITS message or BSM (Signer field) can be reused (e.g., the CPM need not contain this header). Instead, the response CPM might only contain the Trailer/Signature. The CPM can have its own signature and can use the certificate in the signer field of the BSM/CAM the responder vehicle sends itself. To link the two messages (e.g., to determine they came from the same vehicle, BSM/CAM and CPM), a receiver may use the Station ID or temporary ID, to identify (e.g., pseudo-identify) the sender vehicle. This allows a receiver to verify a CPM that does not have a signer field. In some scenarios, the use of a delta time may be sufficient in the CPM since CPM may be designed from a CAM template.

Creating Coordinates Adjustments for Sensor Sharing

Sensor sharing coordinates may include delta location information (e.g., from the CAM vehicle position data). The reference position for sensors can be the same or different from the one in the CAM.

Figure 7:
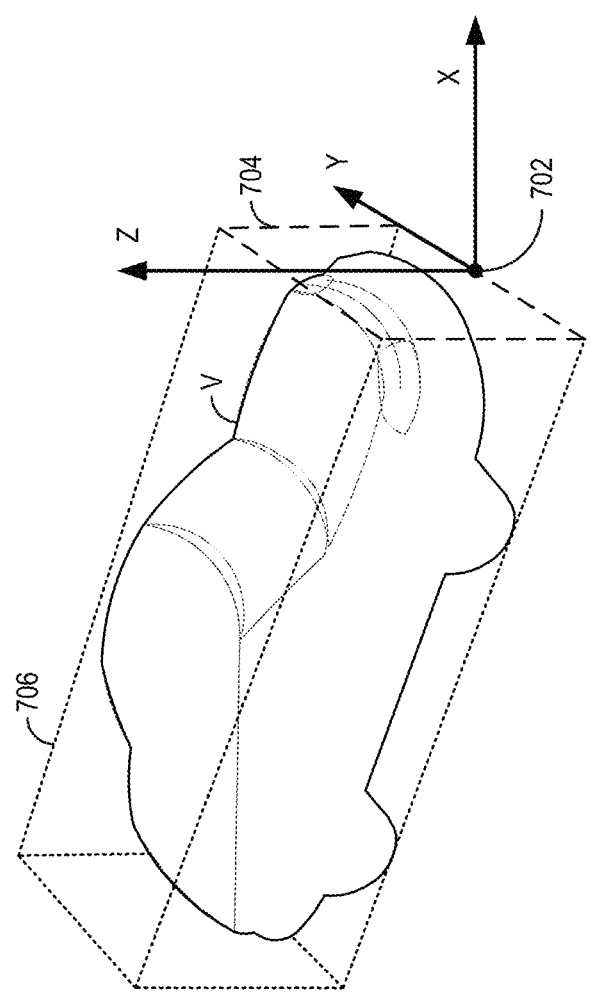
FIG. 7 is a diagram illustrating an example of a reference system in accordance with some aspects of the disclosure.

FIG. 7 illustrates examples of a reference position 702, a reference frame 704, and a bounding box 706. In this example, the reference position 702 is the ground position of the center of the front side of the bounding box of the vehicle.

Figure 8:
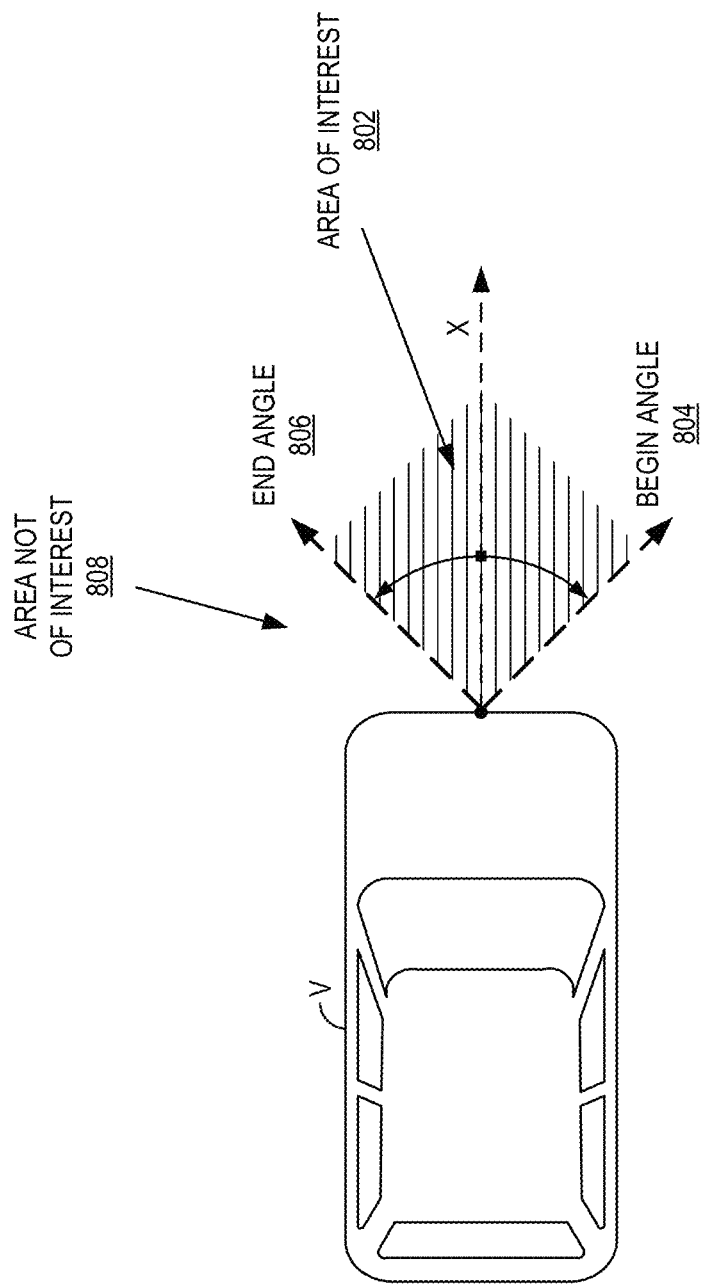
FIG. 8 is a diagram illustrating an example of an area of interest in accordance with some aspects of the disclosure.

FIG. 8 illustrates an example of an area of interest 802 defined by a begin angle 804 and an end angle 806 relative to a vehicle V. An area that is not of interest 808 lies outsides of the area bounded by the begin angle 804 and the end angle 806.

Figure 9:
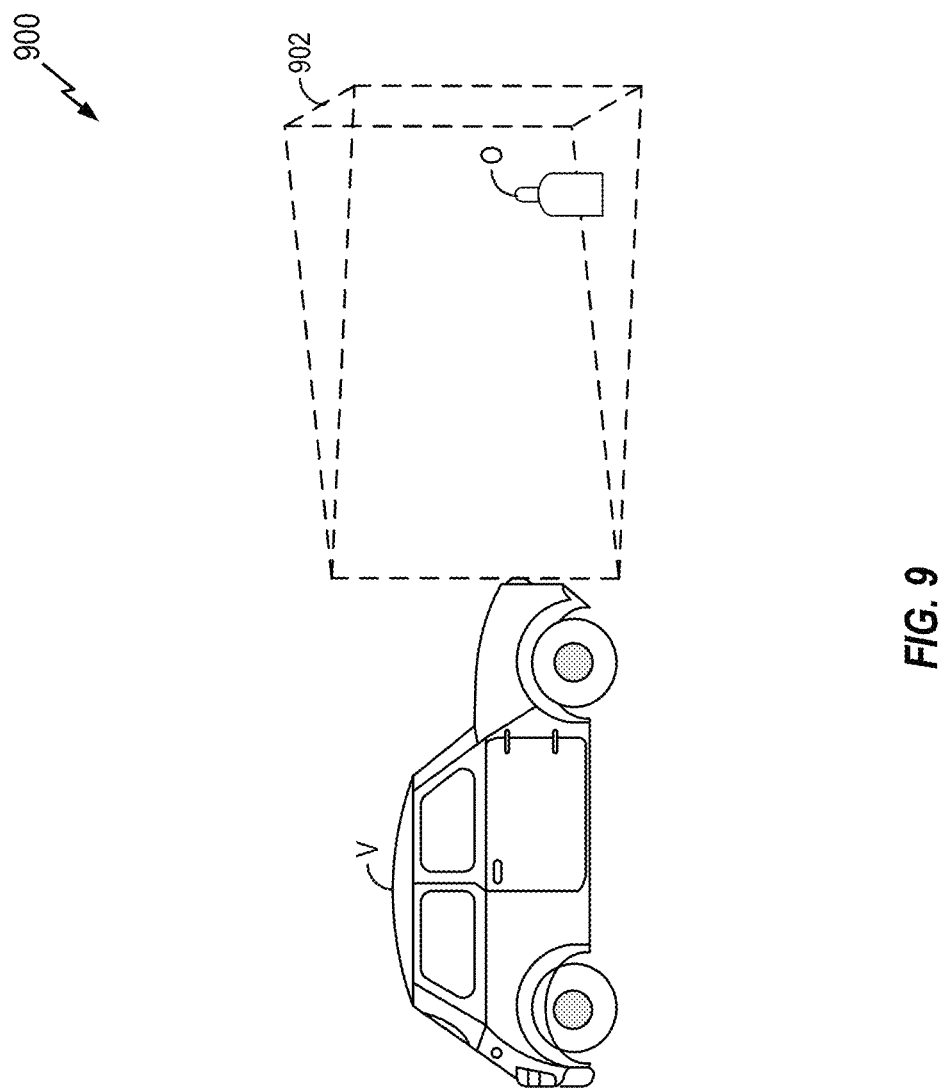
FIG. 9 is a diagram illustrating another example of an area of interest in accordance with some aspects of the disclosure.

FIG. 9 illustrates another example of an area of interest 902 defined relative to a vehicle V. In this example, an object O is identified in the area of interest 902.

Reuse of ETSI ITS Defined CPM for Sensor Sharing

Figure 10:
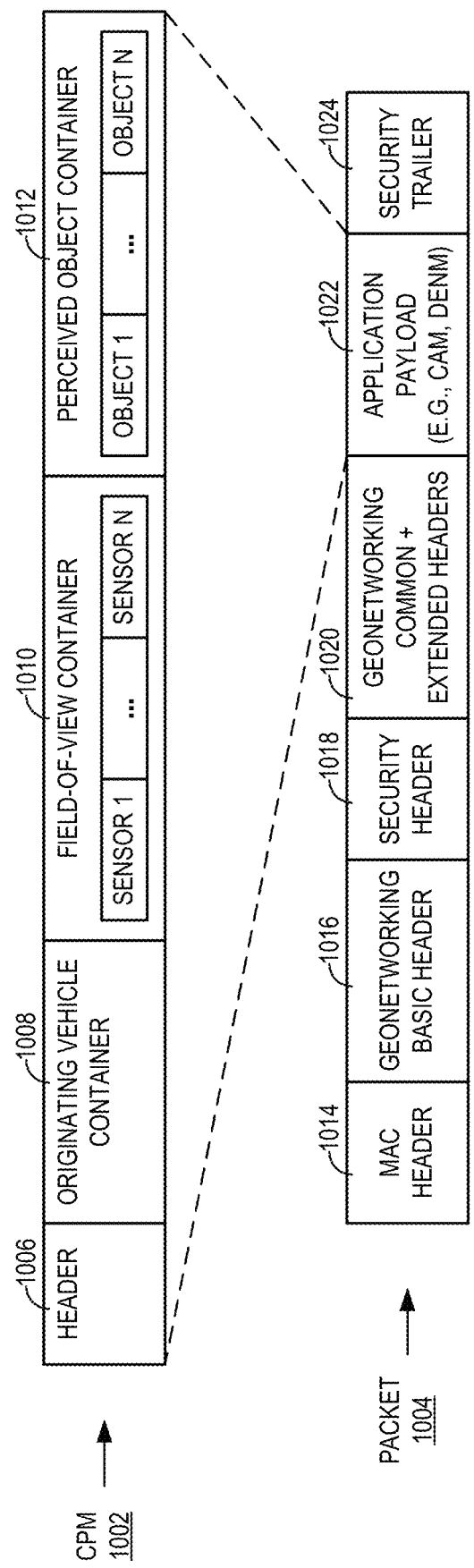
FIG. 10 is a diagram illustrating an example of a collective perception message in accordance with some aspects of the disclosure.

Referring to FIG. 10, the disclosure relates in some aspects to using a Collective Perception Message (CPM) 1002 as the contents of the Response (e.g., the payload of a packet 1004). The CPM 1002 may include a header 1006 (e.g., an ITS PDU header), at least one originating vehicle container 1008, and may optionally include at least one Field-of-View Container 1010, as well as one Perceived Object Container 1012.

In one example implementation, the header 1006 may include a Version field, a Message Type field, and a Station ID field.

The Originating Vehicle Container 1008 may include basic information related to the vehicle sending the CPM, such as generation time, reference position, heading, speed, and vehicle dimensions.

The Field-of-View Container 1010 may include information about the sensing capabilities (e.g., for at least one sensor 1 . . . N) of the disseminating vehicle. This may include generic sensor properties, mounting position of the sensor on the vehicle, as well as the sensor's range and opening angle (i.e. the sensor's frustum), and the sensor type. The information may be used by the receiving vehicles to select appropriate prediction models according to the sensor's capabilities.

The Perceived Object Container 1012 may include a selection of data elements (DEs) for providing an abstract description of at least one perceived object (e.g., object N). DEs may include timing information, size, relative distance and velocity of a perceived object with respect to the disseminating vehicle, as well as object type and other characteristics (dynamic or static for example).

In the example of FIG. 10, the packet 1004 includes a Media Access Control (MAC) header 1014 (e.g., logical link control (LLC) MAC headers), a geonetworking basic header 1016, a security header 1018, geonetworking common and extended headers 1020, an application payload 1022 (e.g., including a CPM, a CAM, or other information), and a security trailer 1024. Other types of packets may be used for carrying a CPM or other similar messages in other implementations.

Collective Perception Request Message

A Collective Perception Request Message may include an ITS PDU header (identifying a CPM Request), an Originating Vehicle Container (OVC) (optional, can be replaced by [Vehicle] Reference Position in the Perception Request Container), a V2X Communication Container (optional), and a Security Container (optional).

A Perception Request Container may include a Station ID (or a sequence of Station IDs), along with an indication of all objects perceived now (default) or in the next few seconds (e.g., indicated by an optional duration). A duration of interest may be a point in time when periodic sensor sharing can stop.

A Perception Request Container may include any Station ID. For example, this container may include all objects or certain types of objects, plus an optional duration of the feed. This information may be dynamic or static, may include object dimension information (e.g., a 1D, 2D, or 3D object), or object type (e.g., pedestrians).

Figure 11:
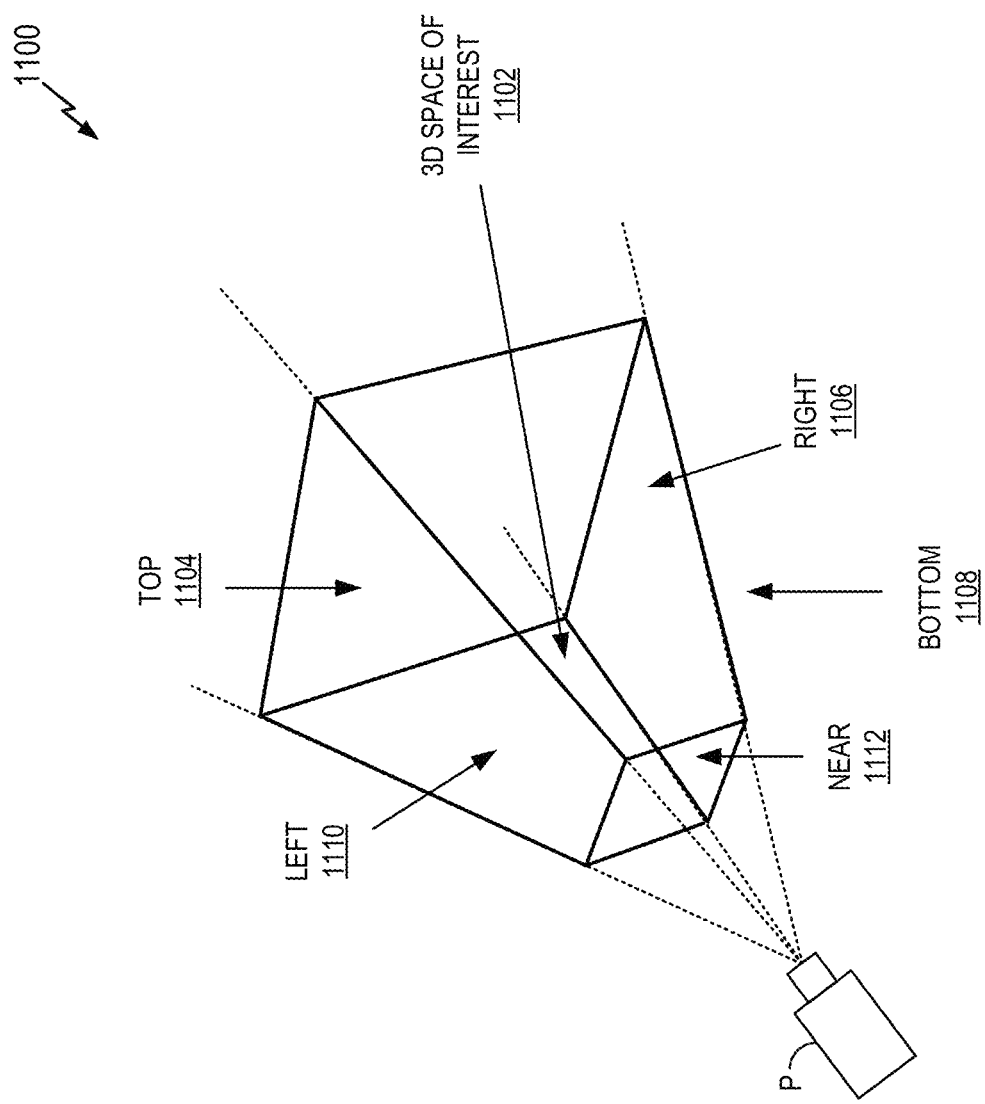
FIG. 11 is a diagram illustrating another example of an area of interest in accordance with some aspects of the disclosure.
Figure 12:
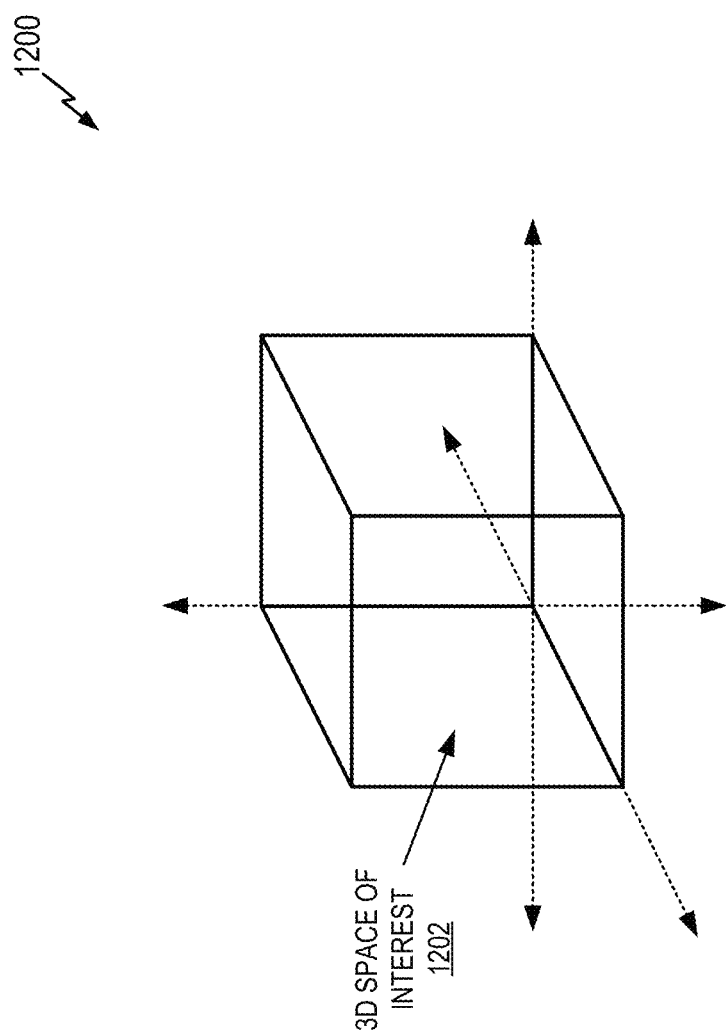
FIG. 12 is a diagram illustrating another example of an area of interest in accordance with some aspects of the disclosure.

A Perception Request Container may include any Station ID plus the 3-D space of interest with respect to the originating vehicle's reference point. FIGS. 11 and 12 illustrate examples of how to represent such 3-D boxes. FIG. 11 illustrates a sensor frustum 1100 defining a 3D space of interest 1102. The frustum may define a beginning and opening angle, and point of reference P (e.g., the same as or different from the point of reference in the Originating Vehicle Container). The frustum 1100 may be define several sides including, for example, a top side 1104, a right side 1106, a bottom side 1108, a left side 1110, and a near side 1112 (i.e., the side nearest the point of reference P), and so on. Depth (e.g., distance from the point of reference) can be specified or left unbounded (e.g., equal to the communication range).

FIG. 12 illustrates an example of a cube 1200 defining a 3D space of interest 1202. For example, the 3D space of interest 1202 may be defined as a point, and 3 sides from the point in directions parallel to the bounding box of the originating vehicle.

V2X Communication Container Format

V2X Communication Container Format information does not need to be understood (e.g., finally processed by) by the CPM layer. Instead, the CPM layer may pass the information down to the access layer when the response is generated. One reason for such an approach may be that a 1:1 link context might not be created inside the AS layer (and these parameters could change per message).

Examples of data elements for this container include: the technology supported (e.g., C-ITS r14, C-ITS r15), the transmit power used, the channel number where a response should be sent, the packet delay bound, the maximum latency tolerated, the maximum number of retransmissions, a channel quality indication-like (QCI-like) index (e.g., used to capture a set of parameters), and communications parameters (e.g., data rate information; minimum modulation and coding scheme (MCS), maximum MCS, the maximum and/or minimum number of resource blocks (RBs), etc.).

Perception Request Container

An example of a Perception Request Container is shown in Table 1.

TABLE 1

| Data Element | Mandatory/Optional | Notes |
| --- | --- | --- |
| Recipient Station ID (1+) 4-byte INT | Optional | Can be set to all zeros to mean any vehicle. Station ID is from the PDU header |

TABLE 1-continued

| Data Element | Mandatory/Optional | Notes |
|---|---|---|
| Period of interest (0 = one snapshot of current conditions) 1 or 10 ms units: 0 . . . 1000 | | (e.g., from any message including CAM, CPM, etc.) 0 for once, or an interval value in 10 ms intervals |
| Sensor Type | Optional | The type of sensor that data is requested from. If not included, any sensor data is requested, including fused sensor data. |
| Zone of interest Reference point relative x,y,z dimensions | | Point to anchor the 3D shape of interest, with respect to the reference point of the vehicle in the OVC. This can be, for example, at the vehicle or further in the front of the vehicle. |
| Zone/Direction of interest Shape (e.g., frustum or box) (enum) or Direction with respect to the reference point. Frustums: open/end angles Boxes: x dimension, y dimension, z dimension for polygons away from the reference point. | | For example, a selected shape, only data from front facing sensors, only data from side facing sensors, etc. |
| Optional Type 1 (1+) | Optional | 1D, 2D, 3D, Static/dynamic, Type (as already defined); or larger than X inches/meters |
| Reference Position (as in OVC) | Included if OVC is not | Latitude/Longitude/Altitude, plus confidence. |

Message Flow

Figure 13:
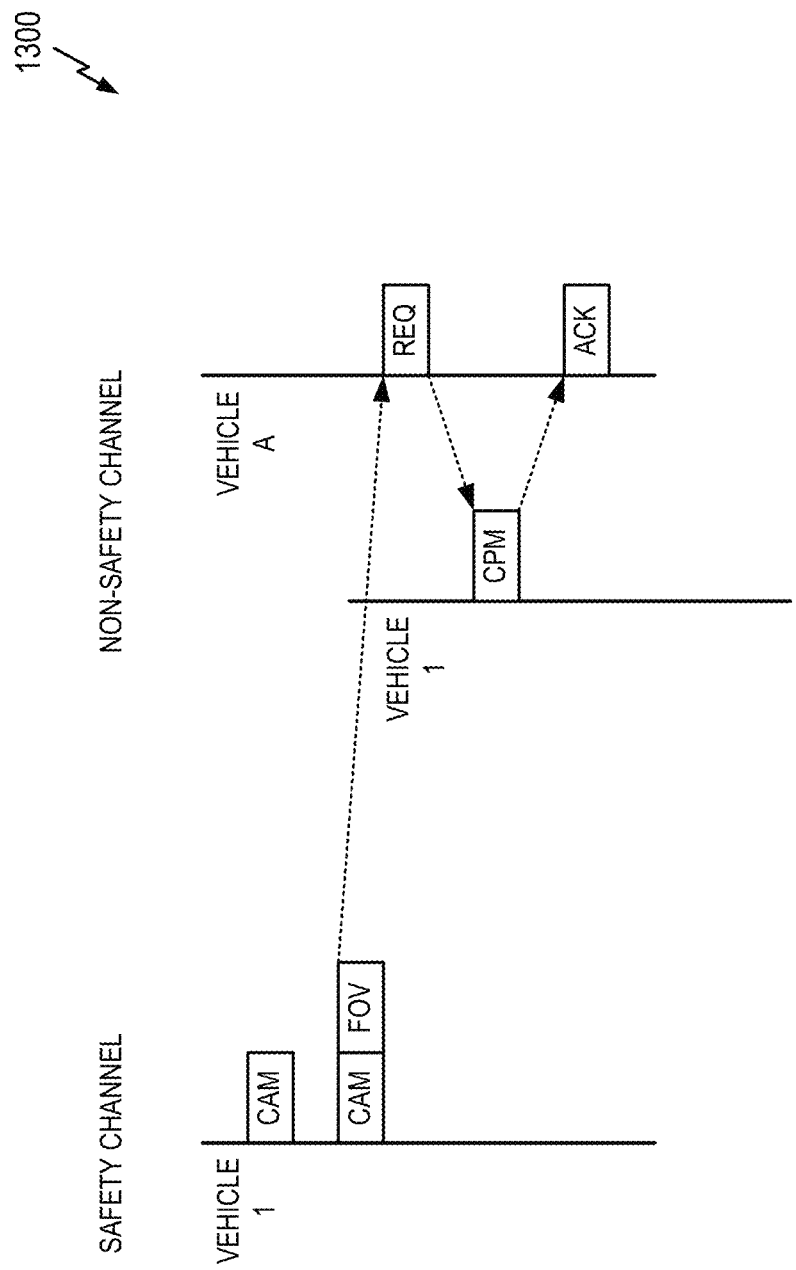
FIG. 13 is a diagram illustrating another example of a message flow in accordance with some aspects of the disclosure.

FIG. 13 illustrates an example of message flow 1300 for a perception response and acknowledgement (ACK). In FIG. 13, a Vehicle 1 is initially in a normal mode of operation and transmits (e.g., CAMs) on a safety channel. At some point in time a Vehicle A sends a request on a non-safety channel (e.g., due to an obstruction that prevents Vehicle A from sensing a particular area). Vehicle 1 sends a CPM in response to the request. Vehicle A may then send an ACK to the response.

The response may be defined as in CPM (ETSI-ITS). The response may be sent periodically as a standalone message. There may be an upper-layer ACK from the requestor. The ACK message is optional (to increase reliability). NAKs with station ID information may also be used.

Responses to requests from multiple requesting vehicles may be aggregated (e.g., wait a certain period of time, monitor what other vehicles send, then send delta information to all requests). There may be a tradeoff between having old data using less bandwidth, and having fresh data but using more bandwidth.

First Example Apparatus

Figure 14:
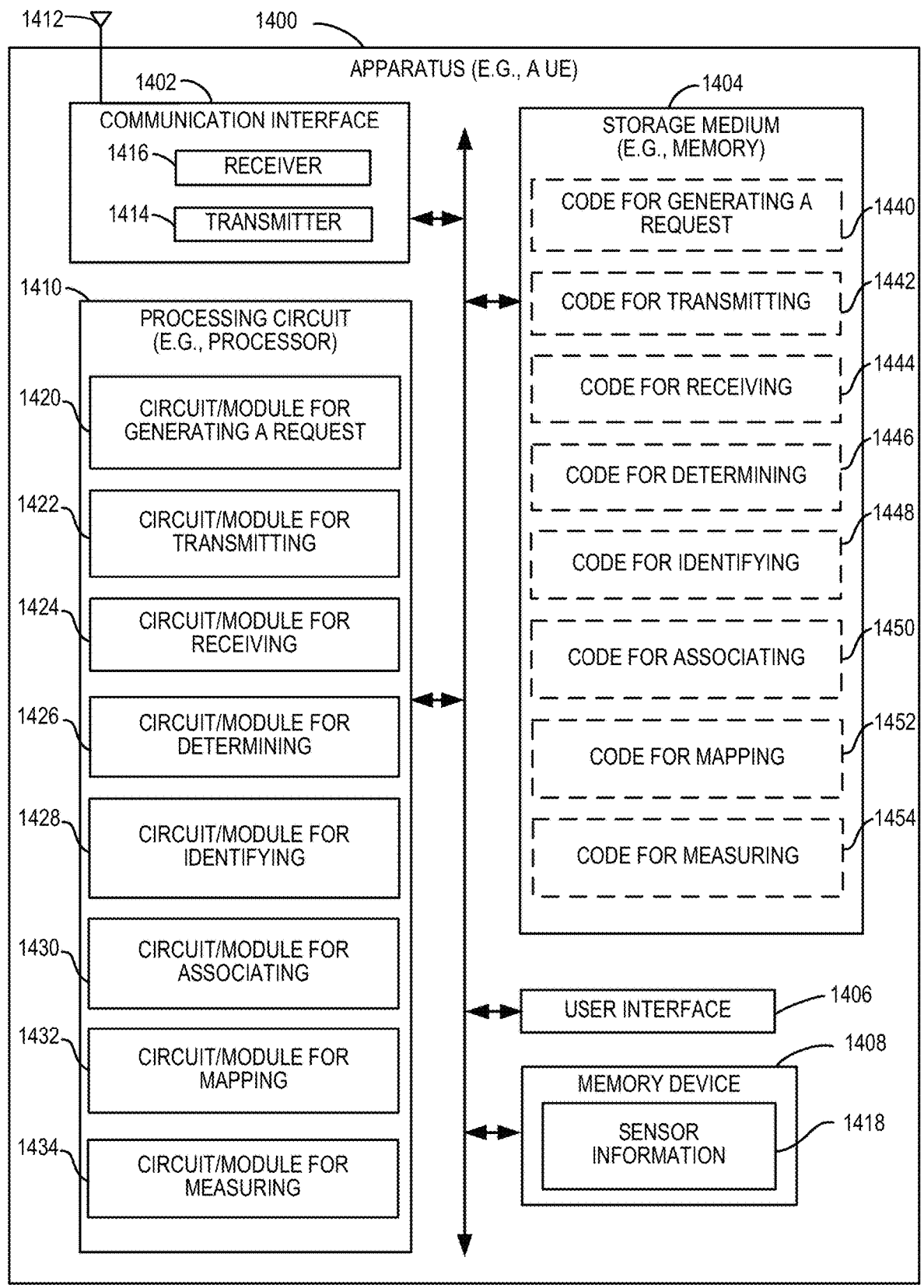
FIG. 14 is a block diagram illustrating an example hardware implementation for an apparatus (e.g., an electronic device) that can support communication in accordance with some aspects of the disclosure.

FIG. 14 illustrates a block diagram of an example hardware implementation of an apparatus 1400 configured to communicate (e.g., using on-demand sensor sharing) according to one or more aspects of the disclosure. The apparatus 1400 could embody or be implemented within a vehicle, a UE, a sensing device, a gNB, a transmit receive point (TRP), an access point, or some other type of device that supports that supports wireless communication with sensor sharing as taught herein. The apparatus 1400 may include at least one sensor and/or be communicatively coupled to at least one sensor for receiving sensor information (sensor(s) not shown in FIG. 14). In various implementations, the apparatus 1400 could embody or be implemented within an access terminal, a base station, or some other type of device. In various implementations, the apparatus 1400 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1400 includes a communication interface 1402 (e.g., at least one transceiver), a storage medium 1404, a user interface 1406, a memory device 1408, and a processing circuit 1410 (e.g., at least one processor). These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 may be adapted to facilitate wireless communication of the apparatus 1400. For example, the communication interface 1402 may include circuitry and/or programming adapted to facilitate the communication of information bi-directionally with respect to one or more communication devices in a network. Thus, in some implementations, the communication interface 1402 may be coupled to one or more antennas 1412 for wireless communication within a wireless communication system. In some implementations, the communication interface 1402 may be configured for wire-based communication. For example, the communication interface 1402 could be a bus interface, a send/receive interface, or some other type of signal interface including drivers, buffers, or other circuitry for outputting and/or obtaining signals (e.g., outputting signal from and/or receiving signals into an integrated circuit). The communication interface 1402 can be configured with one or more standalone receivers and/or transmitters, as well as one or more transceivers. In the illustrated example, the communication interface 1402 includes a transmitter 1414 and a receiver 1416.

The memory device 1408 may represent one or more memory devices. As indicated, the memory device 1408 may maintain sensor information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols. In some aspects, the storage medium 1404 may include a non-transitory computer-readable medium storing computer-executable code, including code to perform the functionality described herein.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13 and 15. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-13 and 15. The processing circuit 1410 may serve as one example of a means for transmitting and/or a means for receiving. In various implementations, the processing circuit 1410 may provide and/or incorporate the functionality of the first wireless communication device 202 of FIG. 2.

According to at least one example of the apparatus 1400, the processing circuit 1410 may include one or more of a circuit/module for generating a request 1420, a circuit/module for transmitting 1422, a circuit/module for receiving 1424, a circuit/module for determining 1426, a circuit/module for identifying 1428, a circuit/module for associating 1430, a circuit/module for mapping 1432, or a circuit/module for measuring 1434. In various implementations, the circuit/module for generating a request 1420, the circuit/module for transmitting 1422, the circuit/module for receiving 1424, the circuit/module for determining 1426, the circuit/module for identifying 1428, the circuit/module for associating 1430, the circuit/module for mapping 1432, or the circuit/module for measuring 1434 may provide and/or incorporate the functionality of the first wireless communication device 202 of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-13 and 15 in various implementations. As shown in FIG. 14, the storage medium 1404 may include one or more of code for generating a request 1440, code for transmitting 1442, code for receiving 1444, code for determining 1446, code for identifying 1448, code for associating 1450, code for mapping 1452, or code for measuring 1454. In various implementations, the code for generating a request 1440, the code for transmitting 1442, the code for receiving 1444, the code for determining 1446, the code for identifying 1448, the code for associating 1450, the code for mapping 1452, or the code for measuring 1454 may be executed or otherwise used to provide the functionality described herein for the circuit/module for generating a request 1420, the circuit/module for transmitting 1422, the circuit/module for receiving 1424, the circuit/module for determining 1426, the circuit/module for identifying 1428, the circuit/module for associating 1430, the circuit/module for mapping 1432, or the circuit/module for measuring 1434.

The circuit/module for generating a request 1420 may include circuitry and/or programming (e.g., code for generating a request 1440 stored on the storage medium 1404) adapted to perform several functions relating to, for example, generating a request for vehicle sensor information (e.g., by performing corresponding operations as discussed herein based on any corresponding criterion as discussed herein). In some aspects, the circuit/module for generating a request 1420 (e.g., a means for generating a request) may correspond to, for example, a processing circuit.

The circuit/module for transmitting 1422 may include circuitry and/or programming (e.g., code for transmitting 1442 stored on the storage medium 1404) adapted to perform several functions relating to, for example, transmitting (e.g., sending) information. In some implementations, the circuit/module for transmitting 1422 may obtain information (e.g., from the memory device 1408, or some other component of the apparatus 1400) and process the information (e.g., encode the information for transmission). In some scenarios, the circuit/module for transmitting 1422 sends the information to another component (e.g., the transmitter 1414, the communication interface 1402, or some other component) that will send the information to another device. In some scenarios (e.g., if the circuit/module for transmitting 1422 includes a transmitter), the circuit/module for transmitting 1422 transmits the information directly to another device (e.g., the ultimate destination) via radio frequency signaling or some other type of signaling suitable for the applicable communication medium.

The circuit/module for transmitting 1422 (e.g., a means for outputting, a means for sending, a means for transmitting, etc.) may take various forms. In some aspects, the circuit/module for transmitting 1422 may correspond to, for example, a processing circuit as discussed herein. In some aspects, the circuit/module for transmitting 1422 may correspond to, for example, an interface (e.g., a bus interface, a send interface, or some other type of signal interface), a communication device, a transceiver, a transmitter, or some other similar component as discussed herein. In some implementations, the communication interface 1402 includes the circuit/module for transmitting 1422 and/or the code for transmitting 1442. In some implementations, the circuit/module for transmitting 1422 and/or the code for transmitting 1442 is configured to control the communication interface 1402 (e.g., a transceiver or a transmitter) to transmit information.

The circuit/module for receiving 1424 may include circuitry and/or programming (e.g., code for receiving 1444 stored on the storage medium 1404) adapted to perform several functions relating to, for example, receiving information. In some scenarios, the circuit/module for receiving 1424 may obtain information (e.g., from the communication interface 1402, the memory device, or some other component of the apparatus 1400) and process (e.g., decode) the information. In some scenarios (e.g., if the circuit/module for receiving 1424 is or includes an RF receiver), the circuit/module for receiving 1424 may receive information directly from a device that transmitted the information. In either case, the circuit/module for receiving 1424 may output the obtained information to another component of the apparatus 1400 (e.g., the memory device 1408, or some other component).

The circuit/module for receiving 1424 (e.g., a means for receiving) may take various forms. In some aspects, the circuit/module for receiving 1424 may correspond to, for example, an interface (e.g., a bus interface, a /receive interface, or some other type of signal interface), a communication device, a transceiver, a receiver, or some other similar component as discussed herein. In some implementations, the communication interface 1402 includes the circuit/module for receiving 1424 and/or the code for receiving 1444. In some implementations, the circuit/module for receiving 1424 and/or the code for receiving 1444 is configured to control the communication interface 1402 (e.g., a transceiver or a receiver) to receive information.

The circuit/module for determining 1426 may include circuitry and/or programming (e.g., code for determining 1446 stored on the storage medium 1404) adapted to perform several functions relating to, for example, determining information, determining whether a condition has been met, or determining whether to perform an operation. In some aspects, the circuit/module for determining 1426 (e.g., a means for determining) may correspond to, for example, a processing circuit.

The circuit/module for determining 1426 represents one or more circuit/modules for performing one or more operations. In some implementations, the apparatus 1400 may include different circuits/modules for determining that perform different operations. For example, one form of the circuit/module for determining 1426 may determine at least one sensor capability (e.g., by performing corresponding operations as discussed herein based on any corresponding criterion as discussed herein). As another example, one form of the circuit/module for determining 1426 may determine at least one lower layer transmission characteristic (e.g., by performing corresponding operations as discussed herein based on any corresponding criterion as discussed herein). As another example, one form of the circuit/module for determining 1426 may determine relative locations of a requestor and a responder (e.g., by performing corresponding operations as discussed herein based on any corresponding criterion as discussed herein). As another example, one form of the circuit/module for determining 1426 may determine an identifier of a responder (e.g., by performing corresponding operations as discussed herein based on any corresponding criterion as discussed herein). As another example, one form of the circuit/module for determining 1426 may determine a V2X identifier (e.g., by performing corresponding operations as discussed herein based on any corresponding criterion as discussed herein). As another example, one form of the circuit/module for determining 1426 may determine sensor information (e.g., by performing corresponding operations as discussed herein based on any corresponding criterion as discussed herein). As another example, one form of the circuit/module for determining 1426 may determine whether a received response includes sensor information (e.g., by performing corresponding operations as discussed herein based on any corresponding criterion as discussed herein). As another example, one form of the circuit/module for determining 1426 may determine whether to generate a request (e.g., by performing corresponding operations as discussed herein based on any corresponding criterion as discussed herein). As another example, one form of the circuit/module for determining 1426 may determine at least one transmission parameter (e.g., by performing corresponding operations as discussed herein based on any corresponding criterion as discussed herein).

The circuit/module for identifying 1428 may include circuitry and/or programming (e.g., code for identifying 1448 stored on the storage medium 1404) adapted to perform several functions relating to, for example, identifying information. In some aspects, the circuit/module for identifying 1428 (e.g., a means for identifying) may correspond to, for example, a processing circuit.

The circuit/module for identifying 1428 represents one or more circuit/modules for performing one or more operations. In some implementations, the apparatus 1400 may include different circuits/modules for identifying that perform different operations. For example, one form of the circuit/module for identifying 1428 may identify at least one sensor capability (e.g., by performing corresponding operations as discussed herein based on any corresponding criterion as discussed herein). As another example, one form of the circuit/module for identifying 1428 may identify at least one content of a request (e.g., by performing corresponding operations as discussed herein based on any corresponding criterion as discussed herein). As another example, one form of the circuit/module for identifying 1428 may identify sensor information (e.g., by performing corresponding operations as discussed herein based on any corresponding criterion as discussed herein).

The circuit/module for associating 1430 may include circuitry and/or programming (e.g., code for associating 1450 stored on the storage medium 1404) adapted to perform several functions relating to, for example, associating a request with a message (e.g., by performing corresponding operations as discussed herein based on any corresponding criterion as discussed herein). In some aspects, the circuit/module for associating 1430 (e.g., a means for associating) may correspond to, for example, a processing circuit.

The circuit/module for mapping 1432 may include circuitry and/or programming (e.g., code for mapping 1452 stored on the storage medium 1404) adapted to perform several functions relating to, for example, mapping one identifier to another identifier (e.g., by performing corresponding operations as discussed herein based on any corresponding criterion as discussed herein). In some aspects, the circuit/module for mapping 1432 (e.g., a means for mapping) may correspond to, for example, a processing circuit.

The circuit/module for measuring 1434 may include circuitry and/or programming (e.g., code for measuring 1454 stored on the storage medium 1404) adapted to perform several functions relating to, for example, measuring a vehicle information message (e.g., by performing corresponding operations as discussed herein based on any corresponding criterion as discussed herein). In some aspects, the circuit/module for measuring 1434 (e.g., a means for measuring) may correspond to, for example, a processing circuit.

First Example Process

Figure 15:
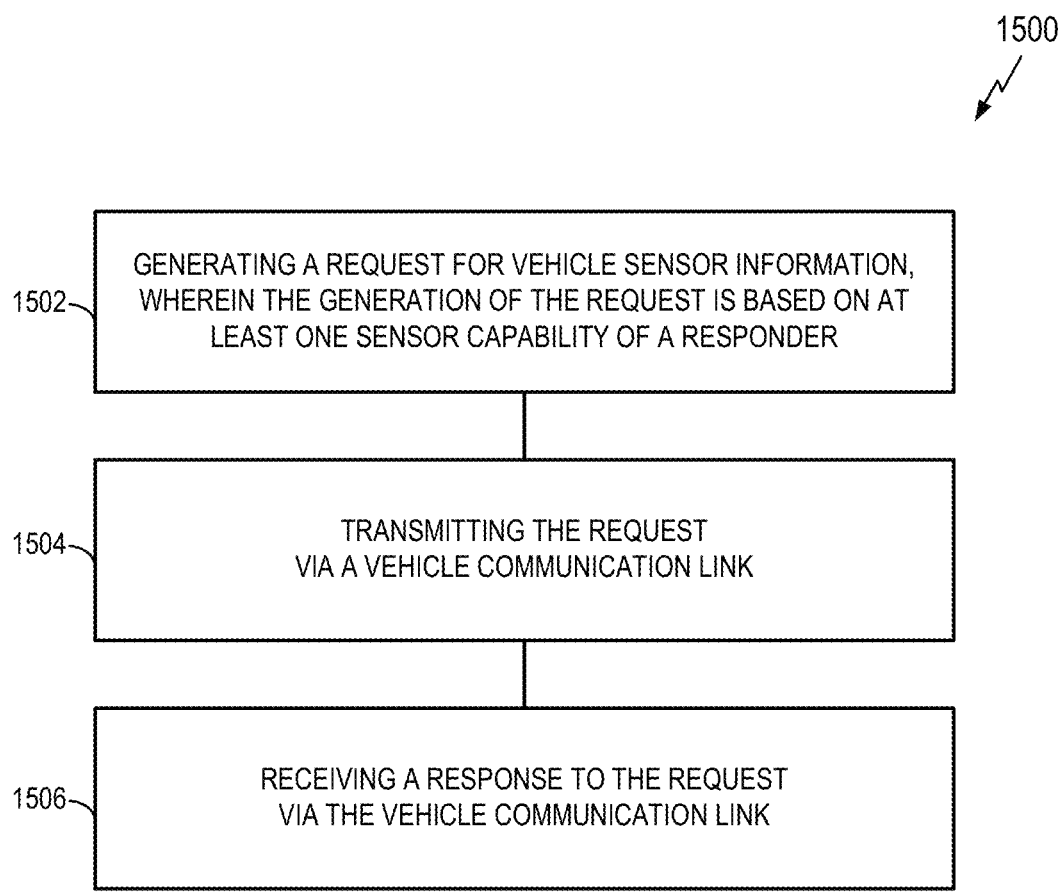
FIG. 15 is a flowchart illustrating an example of a communication process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a vehicle, a UE, an access terminal, a gNB, a TRP, a base station, or some other suitable apparatus. Of course, in various aspects within the scope of the disclosure, the process 1500 may be implemented by any suitable apparatus capable of supporting communication-related operations.

At block 1502, an apparatus (e.g., a UE) generates a request for vehicle sensor information. In some aspects, the generation of the request may based on at least one sensor capability of a responder. For example, an apparatus (e.g., in a vehicle) may dynamically generate requests to be transmitted by the apparatus, taking into account known or anticipated sensor capabilities of one or more potential responders (e.g., a potential responder in the vicinity of the apparatus). In some aspects, the request may specify at least one type of sensor information being requested. In some aspects, the request may specify at least one criterion for responding to the request.

In some aspects, the process 1500 may further include identifying sensor information to be requested (e.g., due to one or more of an obstruction, environmental conditions, limited apparatus capabilities, etc.); determining whether at least one received response (e.g., a previously received response) includes the identified sensor information; and determining, based on the determination of whether at least one received response includes the identified sensor information, whether to generate the request.

In some aspects, the process 1500 may further include determining at least one capability of a responder. In this case, the generation of the request may be based on the determined at least one capability. In some aspects, the determination of the at least one capability may include: receiving a vehicle information message (or other information); and determining at least one sensor capability (e.g., a sensor sharing capability) of a responder based on the vehicle information message (or other information).

In some aspects, the request may include a set of vehicle-to-anything communication control information. In some aspects, the set of vehicle-to-anything communication control information may identify at least one of: a carrier frequency to be used for responding to the request, modulation to be used for responding to the request, coding to be used for responding to the request, physical layer resource blocks to be used for responding to the request, a multiple-input multiple-output (MIMO) configuration to be used for responding to the request, or any combination thereof.

In some aspects, the request may include security information based on security information contained within at least one vehicle information message received from a particular source. In some aspects, the at least one vehicle information message may include a basic safety message (BSM) received from the particular source, a cooperative awareness message (CAM) received from the particular source, or a combination thereof.

In some aspects, the request may include a set of sensor perception information. In some aspects, the set of sensor perception information may identify at least one of: reference position information, a period of interest, at least one sensor type, at least one sensor identifier, at least one requested object type, at least one zone of interest, or any combination thereof.

In some aspects, the request may indicate at least one of: a schedule for responding to the request, at least one transmission parameter for responding to the request, a radio access technology (RAT) to be used for responding to the request, a carrier frequency to be used for responding to the request, at least one attribute of the apparatus, a vehicle-to-anything communication identifier associated with the apparatus, a cooperative awareness message (CAM) station identifier associated with the apparatus, a basic safety message (BSM) station identifier associated with the apparatus, or any combination thereof.

In some aspects, the process 1500 may further include determining at least one lower layer transmission characteristic (e.g., used by the apparatus and/or a responder); and identifying at least one content of the request based on the at least one lower layer transmission characteristic. For example, less information may be requested if allocated communication resources are busy.

In some aspects, the process 1500 may further include determining relative locations of a requestor and a responder; and identifying at least one content of the request based on the relative locations. For example, different types of sensor information may be requested depending on whether the devices a close to one another or far from one another (e.g., based on a comparison of the distance between the devices to one or more thresholds).

In some aspects, the process 1500 may further include receiving a vehicle information message; and associating the request with the received vehicle information message (e.g., based on a mapping). In some aspects, the vehicle information message may include (e.g., may be) a basic safety message (BSM) or a cooperative awareness message (CAM). In some aspects, the association of the request with the vehicle information message may include referencing, in the request, location information of the vehicle information message, security information of the vehicle information message, or a combination thereof.

In some aspects, the process 1500 may further include receiving a vehicle information message; and determining a first identifier of a responder based on the vehicle information message. For example, the apparatus may identify a first identifier of the responder that is associated with the vehicle information message (e.g., the identifier is in the message or mapped to the message via a mapping).

In some aspects, the process 1500 may further include determining a vehicle-to-anything communication identifier of the responder; and mapping the first identifier with the vehicle-to-anything communication identifier.

In some aspects, the process 1500 may further include measuring at least one vehicle information message (e.g., measuring a received signal quality or strength); and determining at least one transmission parameter (e.g., a modulation and coding scheme) to be used by a responder for responding to the request based on the measurement. In this case, the request may include an indication of the at least one transmission parameter.

At block 1504, the apparatus transmits the request via a vehicle communication network link. In some aspects, the vehicle communication network link may include (e.g., may be) a direct link. For example, the link may be a wireless communication link (i.e., over-the-air) between a requestor and at least one responder, where the link does not encompass another network (e.g., a cellular network). For example, the link may be established as or within a vehicle area network. In some aspects, the vehicle communication network link may include (e.g., may be) a vehicle-to-anything communication link.

In some aspects, the transmission of the request may include broadcasting or multicasting the request. In some aspects, the request may include at least one criterion for a responder to use to determine whether to respond to the request. In some aspects, the response may include (e.g., may be) a unicast message.

In some aspects, the transmission of the request may include unicasting the request. In some aspects, the request may include an identifier of a responder. In some aspects, the process 1500 may further include receiving a vehicle information message from the responder; and identifying the responder based on an identifier associated with the vehicle information message.

At block 1506, the apparatus receives a response to the request via the vehicle communication network link. In some aspects, the process 1500 may further include determining, based on the response, whether to generate a signal relating to operation of a vehicle. In some aspects, the signal relating to operation of a vehicle comprises a warning signal, a control signal, or a combination thereof.

In some aspects, a process implemented in accordance with the teachings herein may include any combination of the above operations and/or features.

Second Example Apparatus

Figure 16:
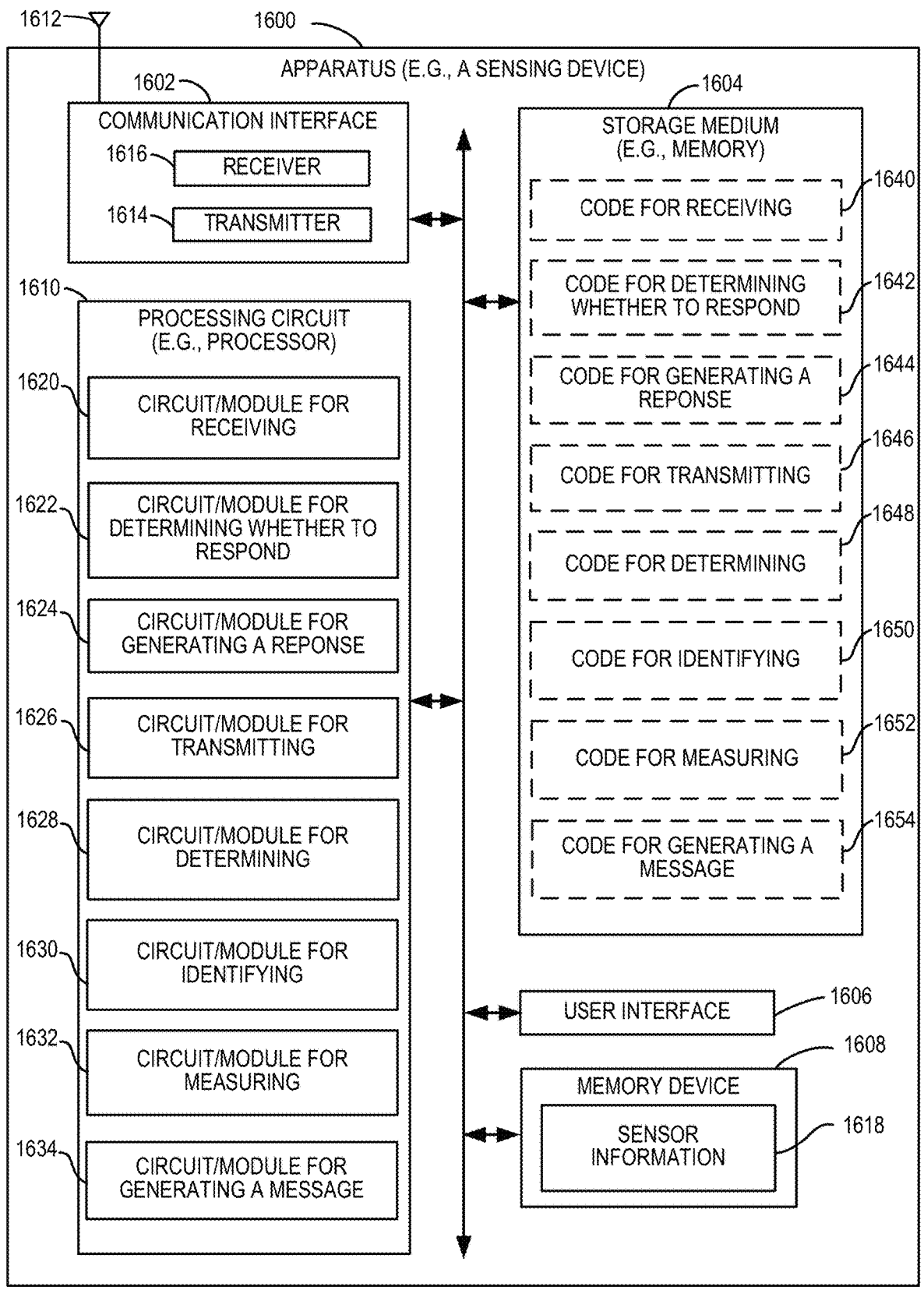
FIG. 16 is a block diagram illustrating another example hardware implementation for an apparatus (e.g., an electronic device) that can support communication in accordance with some aspects of the disclosure.

FIG. 16 illustrates a block diagram of an example hardware implementation of an apparatus 1600 configured to communicate (e.g., using on-demand sensor sharing) according to one or more aspects of the disclosure. The apparatus 1600 could embody or be implemented within a sensing device, a vehicle, a UE, a gNB, transmit receive point (TRP), an access point, or some other type of device that supports wireless communication with sensor sharing as taught herein. The apparatus 1600 may include at least one sensor and/or be communicatively coupled to at least one sensor for receiving sensor information (sensor(s) not shown in FIG. 16). In various implementations, the apparatus 1600 could embody or be implemented within a base station, an access terminal, or some other type of device. In various implementations, the apparatus 1600 could embody or be implemented within a mobile phone, a smart phone, a tablet, a portable computer, a personal computer, a sensor, an alarm, a vehicle, a machine, a server, a network entity, an entertainment device, a medical device, or any other electronic device having circuitry.

The apparatus 1600 includes a communication interface 1602 (e.g., at least one transceiver), a storage medium 1604, a user interface 1606, a memory device 1608 (e.g., storing sensor information 1618), and a processing circuit 1610 (e.g., at least one processor). In various implementations, the user interface 1606 may include one or more of: a keypad, a display, a speaker, a microphone, a touchscreen display, of some other circuitry for receiving an input from or sending an output to a user. The communication interface 1602 may be coupled to one or more antennas 1612, and may include a transmitter 1614 and a receiver 1616. In general, the components of FIG. 16 may be similar to corresponding components of the apparatus 1400 of FIG. 14.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 1-13 and 17. As used herein, the term "adapted" in relation to the processing circuit 1610 may refer to the processing circuit 1610 being one or more of configured, used, implemented, and/or programmed to perform a particular process, function, operation and/or routine according to various features described herein.

The processing circuit 1610 may be a specialized processor, such as an application specific integrated circuit (ASIC) that serves as a means for (e.g., structure for) carrying out any one of the operations described in conjunction with FIGS. 1-13 and 17. The processing circuit 1610 may serve as one example of a means for transmitting and/or a means for receiving. In various implementations, the processing circuit 1610 may provide and/or incorporate the functionality of the second wireless communication device 204 of FIG. 2.

According to at least one example of the apparatus 1600, the processing circuit 1610 may include one or more of a circuit/module for receiving 1620, a circuit/module for determining whether to respond 1622, a circuit/module for generating a response 1624, a circuit/module for transmitting 1626, a circuit/module for determining 1628, a circuit/module for identifying 1630, a circuit/module for measuring 1632, or a circuit/module for generating a message 1634. In various implementations, the circuit/module for receiving 1620, the circuit/module for determining whether to respond 1622, the circuit/module for generating a response 1624, the circuit/module for transmitting 1626, the circuit/module for determining 1628, the circuit/module for identifying 1630, the circuit/module for measuring 1632, or the circuit/module for generating a message 1634 may provide and/or incorporate the functionality of the second wireless communication device 204 of FIG. 2.

As mentioned above, programming stored by the storage medium 1604, when executed by the processing circuit 1610, causes the processing circuit 1610 to perform one or more of the various functions and/or process operations described herein. For example, the programming may cause the processing circuit 1610 to perform the various functions, steps, and/or processes described herein with respect to FIGS. 1-13 and 17 in various implementations. As shown in FIG. 16, the storage medium 1604 may include one or more of code for receiving 1640, code for determining whether to respond 1642, code for generating a response 1644, code for transmitting 1646, code for determining 1648, code for identifying 1650, code for measuring 1652, or code for generating a message 1654. In various implementations, the code for receiving 1640, the code for determining whether to respond 1642, the code for generating a response 1644, the code for transmitting 1646, the code for determining 1648, the code for identifying 1650, the code for measuring 1652, or the code for generating a message 1654 may be executed or otherwise used to provide the functionality described herein for the circuit/module for receiving 1620, the circuit/module for determining whether to respond 1622, the circuit/module for generating a response 1624, the circuit/module for transmitting 1626, the circuit/module for determining 1628, the circuit/module for identifying 1630, the circuit/module for measuring 1632, or the circuit/module for generating a message 1634.

The circuit/module for receiving 1620 may include circuitry and/or programming (e.g., code for receiving 1640 stored on the storage medium 1604) adapted to perform several functions relating to, for example, receiving information. In some scenarios, the circuit/module for receiving 1620 may obtain information (e.g., from the communication interface 1602, the memory device, or some other component of the apparatus 1600) and process (e.g., decode) the information. In some scenarios (e.g., if the circuit/module for receiving 1620 is or includes an RF receiver), the circuit/module for receiving 1620 may receive information directly from a device that transmitted the information. In either case, the circuit/module for receiving 1620 may output the obtained information to another component of the apparatus 1600 (e.g., the memory device 1608, or some other component).

The circuit/module for receiving 1620 (e.g., a means for receiving) may take various forms. In some aspects, the circuit/module for receiving 1620 may correspond to, for example, an interface (e.g., a bus interface, a /receive interface, or some other type of signal interface), a communication device, a transceiver, a receiver, or some other similar component as discussed herein. In some implementations, the communication interface 1602 includes the circuit/module for receiving 1620 and/or the code for receiving 1640. In some implementations, the circuit/module for receiving 1620 and/or the code for receiving 1640 is configured to control the communication interface 1602 (e.g., a transceiver or a receiver) to receive information.

The circuit/module for determining whether to respond 1622 may include circuitry and/or programming (e.g., code for determining whether to respond 1642 stored on the storage medium 1604) adapted to perform several functions relating to, for example, determining whether to respond to a request (e.g., by performing corresponding operations as discussed herein based on any corresponding criterion as discussed herein). In some aspects, the circuit/module for determining whether to respond 1622 (e.g., a means for determining whether to respond) may correspond to, for example, a processing circuit.

The circuit/module for generating a response 1624 may include circuitry and/or programming (e.g., code for generating a response 1644 stored on the storage medium 1604) adapted to perform several functions relating to, for example, generating a response to a request (e.g., by performing corresponding operations as discussed herein based on any corresponding criterion as discussed herein). In some aspects, the circuit/module for generating a response 1624 (e.g., a means for generating a response) may correspond to, for example, a processing circuit.

The circuit/module for transmitting 1626 may include circuitry and/or programming (e.g., code for transmitting 1646 stored on the storage medium 1604) adapted to perform several functions relating to, for example, transmitting (e.g., sending) information. In some implementations, the circuit/module for transmitting 1626 may obtain information (e.g., from the memory device 1608, or some other component of the apparatus 1600) and process the information (e.g., encode the information for transmission). In some scenarios, the circuit/module for transmitting 1626 sends the information to another component (e.g., the transmitter 1614, the communication interface 1602, or some other component) that will send the information to another device. In some scenarios (e.g., if the circuit/module for transmitting 1626 includes a transmitter), the circuit/module for transmitting 1626 transmits the information directly to another device (e.g., the ultimate destination) via radio frequency signaling or some other type of signaling suitable for the applicable communication medium.

The circuit/module for transmitting 1626 (e.g., a means for outputting, a means for sending, a means for transmitting, etc.) may take various forms. In some aspects, the circuit/module for transmitting 1626 may correspond to, for example, a processing circuit as discussed herein. In some aspects, the circuit/module for transmitting 1626 may correspond to, for example, an interface (e.g., a bus interface, a send interface, or some other type of signal interface), a communication device, a transceiver, a transmitter, or some other similar component as discussed herein. In some implementations, the communication interface 1602 includes the circuit/module for transmitting 1626 and/or the code for transmitting 1646. In some implementations, the circuit/module for transmitting 1626 and/or the code for transmitting 1646 is configured to control the communication interface 1602 (e.g., a transceiver or a transmitter) to transmit information.

The circuit/module for determining 1628 may include circuitry and/or programming (e.g., code for determining 1648 stored on the storage medium 1604) adapted to perform several functions relating to, for example, determining information, determining whether a condition has been met, or determining whether to perform an operation. In some aspects, the circuit/module for determining 1628 (e.g., a means for determining) may correspond to, for example, a processing circuit.

The circuit/module for determining 1628 represents one or more circuit/modules for performing one or more operations. In some implementations, the apparatus 1600 may include different circuits/modules for determining that perform different operations. For example, one form of the circuit/module for determining 1628 may determine at least one lower layer transmission characteristic (e.g., by performing corresponding operations as discussed herein based on any corresponding criterion as discussed herein). As another example, one form of the circuit/module for determining 1628 may determine relative locations of a requestor and a responder (e.g., by performing corresponding operations as discussed herein based on any corresponding criterion as discussed herein). As another example, one form of the circuit/module for determining 1628 may determine that a request is associated with a message (e.g., by performing corresponding operations as discussed herein based on any corresponding criterion as discussed herein). As another example, one form of the circuit/module for determining 1628 may determine at least one transmission parameter (e.g., by performing corresponding operations as discussed herein based on any corresponding criterion as discussed herein). As another example, one form of the circuit/module for determining 1628 may determine whether sensor information has been requested (e.g., by performing corresponding operations as discussed herein based on any corresponding criterion as discussed herein). As another example, one form of the circuit/module for determining 1628 may determine whether to broadcast or multicast a response (e.g., by performing corresponding operations as discussed herein based on any corresponding criterion as discussed herein).

The circuit/module for identifying 1630 may include circuitry and/or programming (e.g., code for identifying 1650 stored on the storage medium 1604) adapted to perform several functions relating to, for example, identifying information. In some aspects, the circuit/module for identifying 1630 (e.g., a means for identifying) may correspond to, for example, a processing circuit.

The circuit/module for identifying 1630 represents one or more circuit/modules for performing one or more operations. In some implementations, the apparatus 1600 may include different circuits/modules for identifying that perform different operations. For example, one form of the circuit/module for identifying 1630 may identify at least one content of a request (e.g., by performing corresponding operations as discussed herein based on any corresponding criterion as discussed herein). As another example, one form of the circuit/module for identifying 1428 may identify sensor information (e.g., by performing corresponding operations as discussed herein based on any corresponding criterion as discussed herein).

The circuit/module for measuring 1632 may include circuitry and/or programming (e.g., code for measuring 1652 stored on the storage medium 1604) adapted to perform several functions relating to, for example, measuring a request (e.g., by performing corresponding operations as discussed herein based on any corresponding criterion as discussed herein). In some aspects, the circuit/module for measuring 1632 (e.g., a means for measuring) may correspond to, for example, a processing circuit.

The circuit/module for generating a message 1634 may include circuitry and/or programming (e.g., code for generating a message 1654 stored on the storage medium 1604) adapted to perform several functions relating to, for example, generating a vehicle information message and/or other types of messages (e.g., by performing corresponding operations as discussed herein based on any corresponding criterion as discussed herein). In some aspects, the circuit/module for generating a message 1634 (e.g., a means for generating a message) may correspond to, for example, a processing circuit.

Second Example Process

Figure 17:
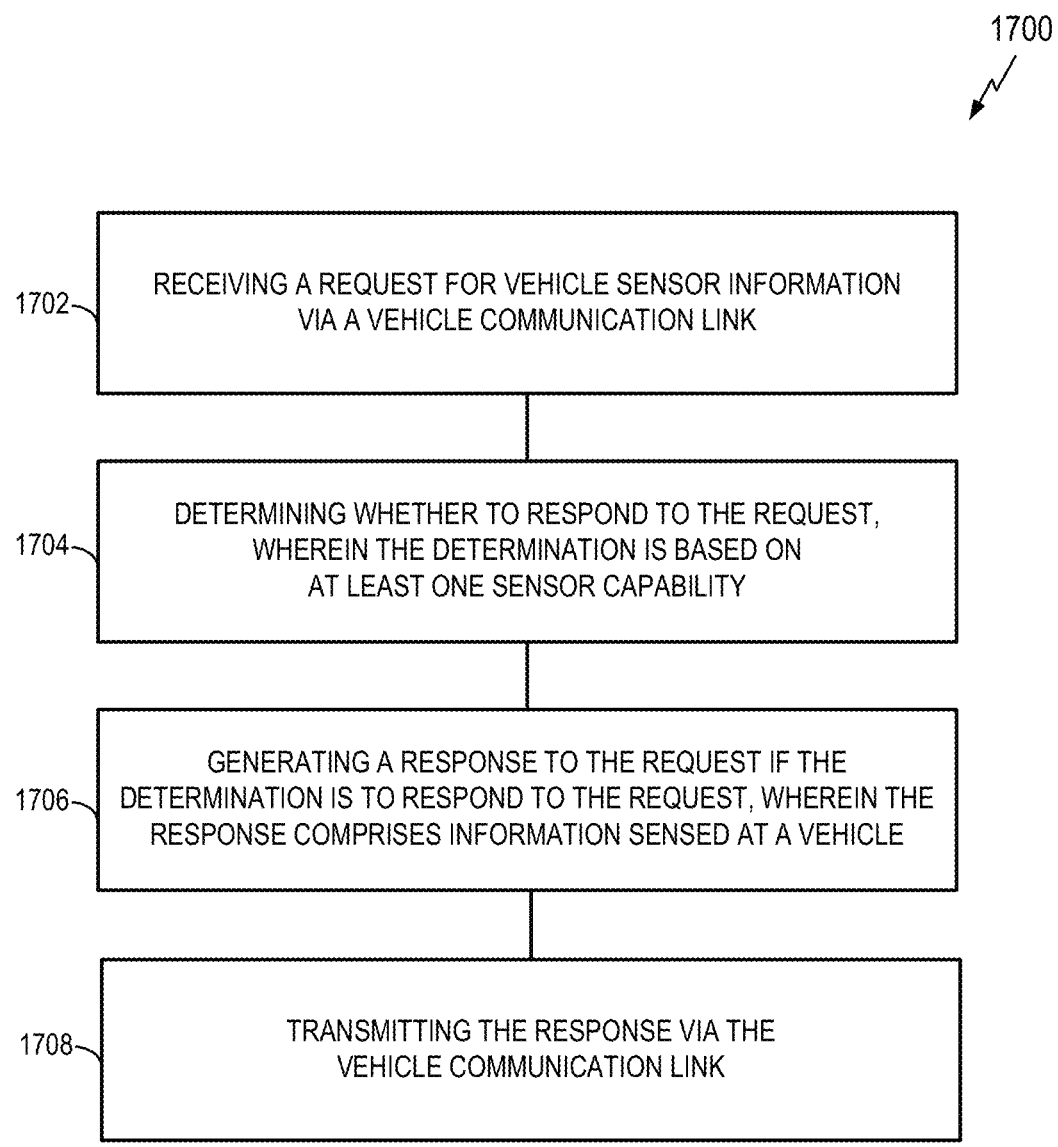
FIG. 17 is a flowchart illustrating an example of a communication process in accordance with some aspects of the disclosure.

FIG. 17 illustrates a process 1700 for communication in accordance with some aspects of the disclosure. The process 1700 may take place within a processing circuit (e.g., the processing circuit 1610 of FIG. 16), which may be located in a sensing device (e.g., a road-side device), a vehicle, a UE, an access terminal, a gNB, a TRP, a base station, or some other suitable apparatus. Of course, in various aspects within the scope of the disclosure, the process 1700 may be implemented by any suitable apparatus capable of supporting communication-related operations.

At block 1702, an apparatus (e.g., a UE) receives a request for vehicle sensor information via a vehicle communication network link. In some aspects, the vehicle communication network link may include (e.g., may be) a direct link. For example, the link may be a wireless communication link (i.e., over-the-air) between a requestor and at least one responder, where the link does not encompass another network (e.g., a cellular network). For example, the link may be established as or within a vehicle area network. In some aspects, the vehicle communication network link may include (e.g., may be) a vehicle-to-anything communication link.

In some aspects, the request may specify at least one type of sensor information being requested. In some aspects, the request may specify at least one criterion for responding to the request.

In some aspects, the request may include a set of vehicle-to-anything communication control information. In some aspects, the set of vehicle-to-anything communication control information may identify at least one of: a carrier frequency to be used for responding to the request, modulation to be used for responding to the request, coding to be used for responding to the request, physical layer resource blocks to be used for responding to the request, a multiple-input multiple-output (MIMO) configuration to be used for responding to the request, or any combination thereof.

In some aspects, the request may include security information based on security information contained within at least one vehicle information message sent by the apparatus In some aspects, the at least one vehicle information message may include a basic safety message (BSM) sent by the apparatus, a cooperative awareness message (CAM) sent by the apparatus, or a combination thereof.

In some aspects, the request may include a set of sensor perception information. In some aspects, the set of sensor perception information may identify at least one of: reference position information, a period of interest, at least one sensor type, at least one sensor identifier, at least one requested object type, at least one zone of interest, or any combination thereof.

In some aspects, the request may indicate at least one of: a schedule for responding to the request, at least one transmission parameter for responding to the request, a radio access technology (RAT) to be used for responding to the request, a carrier frequency to be used for responding to the request, a vehicle-to-anything communication identifier associated with the apparatus, a cooperative awareness message (CAM) station identifier associated with the apparatus, a basic safety message (BSM) station identifier associated with the apparatus, or any combination thereof.

In some aspects, the process 1700 may further include determining at least one lower layer transmission characteristic; and identifying at least one content of the response based on the at least one lower layer transmission characteristic. For example, less information may be sent if allocated communication resources are busy.

In some aspects, the process 1700 may further include determining relative locations of a requestor and a responder; and identifying at least one content of the response based on the relative locations. For example, different types of sensor information may be sent depending on whether the devices a close to one another or far from one another (e.g., based on a comparison of the distance between the devices to one or more thresholds).

In some aspects, the process 1700 may further include determining that the request is associated with a vehicle information message. In some aspects, the vehicle information message may include (e.g., may be) a basic safety message or a cooperative awareness message. In some aspects, the generation of the response may be based on location information of the vehicle information message, security information of the vehicle information message, or a combination thereof.

At block 1704, the apparatus determines whether to respond to the request. In some aspects, the determination is based on at least one sensor capability of the apparatus. For example, the apparatus may elect to respond to the request if the request is for sensor information that the apparatus is capable of sensing.

In some aspects, the request may include (e.g., may be) a broadcast or multicast message. In this case, the request may include at least one response criterion; and the process 1700 may further include determining, based on the at least one response criterion, whether to respond to the request.

In some aspects, the response may include (e.g., may be) a unicast message. In this case, the request may include an identifier of a responder; and the process 1700 may further include determining, based on the identifier, whether to respond to the request.

In some aspects, the determination of whether to respond to the request may include: identifying sensor information requested by the request; determining whether at least one response transmitted by another apparatus includes the identified sensor information; and determining whether to generate the response based on the determination of whether at least one response transmitted by another apparatus includes the identified sensor information.

At block 1706, the apparatus generates a response to the request if the determination is to respond to the request, wherein the response comprises information sensed at a vehicle.

In some aspects, the process 1700 may further include measuring the request (e.g., measuring a received signal quality or strength); and determining at least one transmission parameter (e.g., a modulation and coding scheme) for responding to the request based on the measurement. In some aspects, the determination of the at least one transmission parameter may be further based on at least one vehicle-to-anything communication parameter.

At block 1708, the apparatus transmits the response via the vehicle communication network link.

In some aspects, the process 1700 may further include identifying sensor information requested by the request; determining whether the identified sensor information has been requested by more than one requestor; and determining whether to broadcast or multicast the response based on the determination of whether the identified sensor information has been requested by more than one requestor.

In some aspects, the request may be received on a first resource; and the process 1700 may further include determining whether to send the response on a second resource that is different from the first resource.

In some aspects, the process 1700 may further include generating a vehicle information message including at least one of: radio access technology (RAT) capability of the apparatus, an indication of at least one time at which the apparatus monitors for requests, an indication of at least one resource on which the apparatus monitors for requests, or any combination thereof; and transmitting the vehicle information message using vehicle-to-anything communication.

In some aspects, a process implemented in accordance with the teachings herein may include any combination of the above operations and/or features.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
receiving a message comprising an indication of a location of another apparatus;
determining, based on the location of the other apparatus, that the other apparatus blocks a field-of-view of the apparatus;
generating a request for vehicle sensor information from the other apparatus as a result of the determination, wherein the generation of the request is based on at least one sensor capability of the other apparatus, wherein the generated request for vehicle sensor information from the other apparatus that blocks the field-of-view of the apparatus includes an index assignment, the index assignment indicating to the other apparatus that blocks the field-of-view of the apparatus when to respond within a frame or a transmission time interval (TTI);
transmitting the request via a vehicle communication link;
receiving a schedule based on the index assignment from the other apparatus after transmitting the request; and
determining, based on the schedule, when to monitor for a response to the request via the vehicle communication link.

2. The method of claim 1, further comprising:
determining the at least one sensor capability.

3. The method of claim 2, wherein the determination of the at least one sensor capability comprises:
receiving at least one vehicle information message; and
identifying the at least one sensor capability based on the at least one vehicle information message.

4. The method of claim 1, wherein the request specifies at least one type of sensor information being requested.

5. The method of claim 1, wherein the request specifies at least one criterion for responding to the request.

6. The method of claim 1, wherein the request comprises a set of vehicle-to-anything communication control information.

7. The method of claim 6, wherein the set of vehicle-to-anything communication control information identifies a carrier frequency to be used for responding to the request, modulation to be used for responding to the request, coding to be used for responding to the request, physical layer resource blocks to be used for responding to the request, and a multiple-input multiple-output (MIMO) configuration to be used for responding to the request.

8. The method of claim 1, wherein the request comprises security information based on security information contained within at least one vehicle information message received from a particular source.

9. The method of claim 8, wherein the at least one vehicle information message comprises a basic safety message (BSM) received from the particular source, a cooperative awareness message (CAM) received from the particular source, or a combination thereof.

10. The method of claim 1, wherein the request comprises a set of sensor perception information that identifies reference position information, a period of interest, at least one sensor type, at least one sensor identifier, at least one requested object type, and at least one zone of interest.

11. The method of claim 1, wherein the request indicates at least one of: a schedule for responding to the request, at least one transmission parameter for responding to the request, a radio access technology (RAT) to be used for responding to the request, a carrier frequency to be used for responding to the request, at least one attribute of the apparatus, a vehicle-to-anything communication identifier associated with the apparatus, a cooperative awareness message (CAM) station identifier associated with the apparatus, a basic safety message (BSM) station identifier associated with the apparatus, or any combination thereof.

12. The method of claim 1, further comprising:
determining at least one lower layer transmission characteristic; and
wherein at least one content of the request is based on the at least one lower layer transmission characteristic.

13. The method of claim 1, further comprising:
determining relative locations of the apparatus and the other apparatus; and
identifying at least one content of the request based on the relative locations.

14. The method of claim 1, further comprising:
receiving a vehicle information message; and
associating the request with the received vehicle information message, wherein the association of the request with the vehicle information message comprises referencing, in the request, location information of the vehicle information message, and security information of the vehicle information message.

15. The method of claim 1, further comprising:
receiving a vehicle information message;
determining a first identifier of the other apparatus based on the vehicle information message;
determining a vehicle-to-anything communication identifier of the other apparatus; and
mapping the first identifier with the vehicle-to-anything communication identifier.

16. The method of claim 1, wherein:
the transmission of the request comprises broadcasting or multicasting the request; and
the request comprises at least one criterion for the other apparatus to use to determine whether to respond to the request.

17. The method of claim 1, further comprising:
receiving a vehicle information message from the other apparatus; and
determining an identifier of the other apparatus based on an identifier associated with the vehicle information message,
wherein the request comprises the identifier of the other apparatus.

18. The method of claim 1, further comprising:
identifying sensor information to be requested;
determining whether at least one received response includes the identified sensor information; and determining, based on the determination of whether at least one received response includes the identified sensor information, whether to generate the request.

19. The method of claim 1, further comprising:

measuring at least one signal comprising at least one vehicle information message; and determining at least one transmission parameter to be used by the other apparatus for responding to the request based on the measurement, wherein the request comprises an indication of the at least one transmission parameter.

20. An apparatus for communication comprising:

a memory; and a processor coupled to the memory, the processor and the memory configured to:

receive a message comprising an indication of a location of another apparatus;

determine, based on the location of the other apparatus, that the other apparatus blocks a field-of-view of the apparatus;

generate a request for vehicle sensor information from the other apparatus as a result of the determination, wherein the generation of the request is based on at least one sensor capability of the other apparatus, wherein the generated request for vehicle sensor information from the other apparatus that blocks the field-of-view of the apparatus includes an index assignment, the index assignment indicating to the other apparatus that blocks the field-of-view of the apparatus when to respond within a frame or a transmission time interval (TTI);

transmit the request via a vehicle communication link, receive a schedule based on the index assignment from the other apparatus after transmission of the request; and determine, based on the schedule, when to monitor for a response to the request via the vehicle communication link.

* * * * *